United States Patent
Hall et al.

(10) Patent No.: US 12,188,789 B2
(45) Date of Patent: Jan. 7, 2025

(54) DUAL MODE ROTARY TRANSDUCER

(71) Applicant: Hall Labs LLC

(72) Inventors: Mark Hall, Smithfield, UT (US); Pablo Penailillo, Provo, UT (US); Colby Robbins, Provo, UT (US); Stephen Willes, Provo, UT (US); Bryan Goings, Provo, UT (US)

(73) Assignee: Hall Labs LLC, Provo, UT (US)

( * ) Notice: Subject to any disclaimer, the term of this patent is extended or adjusted under 35 U.S.C. 154(b) by 102 days.

(21) Appl. No.: 18/047,940

(22) Filed: Oct. 19, 2022

(65) Prior Publication Data

US 2023/0119380 A1 Apr. 20, 2023

Related U.S. Application Data

(60) Provisional application No. 63/358,525, filed on Jul. 5, 2022, provisional application No. 63/257,534, filed on Oct. 19, 2021.

(51) Int. Cl.
*G01D 5/14* (2006.01)
*G01D 5/249* (2006.01)

(52) U.S. Cl.
CPC ........... *G01D 5/145* (2013.01); *G01D 5/2497* (2013.01); *G01D 2205/26* (2021.05)

(58) Field of Classification Search
CPC .. G01D 5/145; G01D 5/2497; G01D 2205/26; G01B 7/004; G01C 17/38; G01R 33/0035; G01R 33/0017; G01R 33/34061; G06F 3/017; G06F 3/0346; G06F 3/012; A61B 34/20; A61B 2034/2051; G02B 27/017
See application file for complete search history.

(56) References Cited

U.S. PATENT DOCUMENTS

2016/0057321 A1* 2/2016 Yamaura ................ H03K 17/97
396/299
2021/0110954 A1* 4/2021 Ausserlechner ...... H01F 7/0205

FOREIGN PATENT DOCUMENTS

DE 102010030801 A1 * 1/2012 ............. G01B 21/22

* cited by examiner

*Primary Examiner* — Jermele M Hollington
*Assistant Examiner* — Taqi R Nasir

(57) ABSTRACT

A rotary transducer is described. The rotary transducer includes a Hall effect sensor, a rotary dial comprising at least two recessed pockets, a first magnet that is positioned within one of the at least two recessed pockets, and a second magnet that is positioned within another one of the at least two recessed pockets. In an acceleration only mode, the rotary dial is rotatable from a center position in a first direction and is not rotatable from the center position in a second direction. This mode is selected when a mode selection screw is inserted into a mode selection orifice. In a bi-directional acceleration/deceleration mode, the rotary dial is rotatable from the center position in the first direction and is rotatable from the center position in the second direction. This mode is selected when the mode selection screw is not inserted into the mode selection orifice.

17 Claims, 35 Drawing Sheets

Magnetized Through Thickness

Magnetized Through Diameter

DUAL MODE ROTARY TRANSDUCER

CROSS-REFERENCE TO RELATED APPLICATIONS

The present application for patent claims priority to U.S. Provisional Application No. 63/257,534, filed Oct. 19, 2021, and U.S. Provisional Application No. 63/358,525, filed Jul. 5, 2022, which are assigned to the assignee of the present application and hereby expressly incorporated by reference

TECHNICAL FIELD

The described systems and methods are directed to rotary transducers.

BACKGROUND

Mechanical throttles are ubiquitous. Driven by mechanically controlled carbureted engines, mechanical throttles have historically been physically linked (via a cable or like transmission linkage) that have direct control of throttle functions. With the emergence of electric motor driven devices (e.g., electric scooters, electric bikes, electric motorcycles, and the like) or even traditional fossil-fuel based engines that are electronically controlled (fuel injected with electronic ignition, for example) there is a need for electronic throttles. In particular, there is a need to rethink throttle design, given that the prior mechanical restraints no longer confine throttle design. In addition, electronical motors may be used for acceleration and deceleration (e.g., using regenerative braking) and it is desirable for an electronic throttle that can accommodate multiple applications.

SUMMARY

In a first aspect, a rotary transducer is described. The rotary transducer includes a Hall effect sensor, a rotary dial comprising at least two recessed pockets, a first magnet that is positioned within one of the at least two recessed pockets, and a second magnet that is positioned within another one of the at least two recessed pockets.

In a second aspect, the rotary transducer further includes a housing.

In a third aspect, the rotary transducer further includes a spring mechanism that interfaces with both the housing and the rotary dial. In this third aspect, the spring mechanism centers the rotary dial at a center position with respect to the housing.

In a fourth aspect, the spring mechanism provides increasing spring tension that pulls the rotary dial toward the center position when the rotary dial is deflected in a first direction away from the center position. In another aspect, the spring mechanism provides increasing spring tension that pulls the rotary dial toward the center position when the rotary dial is deflected in a second direction away from the center position.

In a fifth aspect, the second direction is diametrically opposed to the first direction.

In a sixth aspect, the center position is fixed with respect to the housing. In another aspect, the Hall effect sensor is fixed with respect to the housing. In yet another aspect, the rotary dial rotates with respect the housing.

In a seventh aspect, the first magnet and the second magnet are fixed within the rotary dial such that the first magnet and the second magnet rotate with the rotary dial as the rotary dial rotates.

In an eight aspect, the first magnet and the second magnet are positioned within the at least two recessed pockets such that a polarity of the first magnet is opposite from a polarity of the second magnet.

In a ninth aspect, the first magnet and the second magnet create a magnetic field, and wherein the Hall effect sensor outputs a voltage based on the magnetic field.

In a tenth aspect, the magnetic field changes as the rotary dial rotates. In another aspect, the voltage output by the Hall effect sensor changes as the magnetic field changes.

In an eleventh aspect, the housing includes a first mode selection orifice. The first mode selection orifice may be threaded.

In a twelfth aspect, the rotary transducer includes a first mode selection screw.

In a thirteenth aspect, the rotary dial is rotatable from the center position in the first direction over a first range of rotation and is rotatable from the center position in the second direction over a second range of rotation when the first mode selection screw is not inserted into the first mode selection orifice.

In a fourteenth aspect, the Hall effect sensor outputs a first voltage range in response to the rotary dial rotating through the first range of rotation.

In a fifteenth aspect, the first voltage range is between 2.51 volts direct current and 5 volts direct current.

In a sixteenth aspect, the Hall effect sensor outputs a second voltage range in response to the rotary dial rotating through the second range of rotation.

In a seventeenth aspect, the second voltage range is between 0 volts direct current and 2.49 volts direct current.

In an eighteenth aspect, the rotary dial is rotatable from the center position in the first direction over a third range of rotation and is not rotatable from the center position in the second direction when the first mode selection screw is inserted into the first mode selection orifice.

In a nineteenth aspect, the Hall effect sensor outputs a third voltage range in response to the rotary dial rotating through the third range of rotation.

In a twentieth aspect, the third voltage range is between 0 volts direct current and 5 volts direct current.

Further aspects and embodiments are provided in the foregoing drawings, detailed description, and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
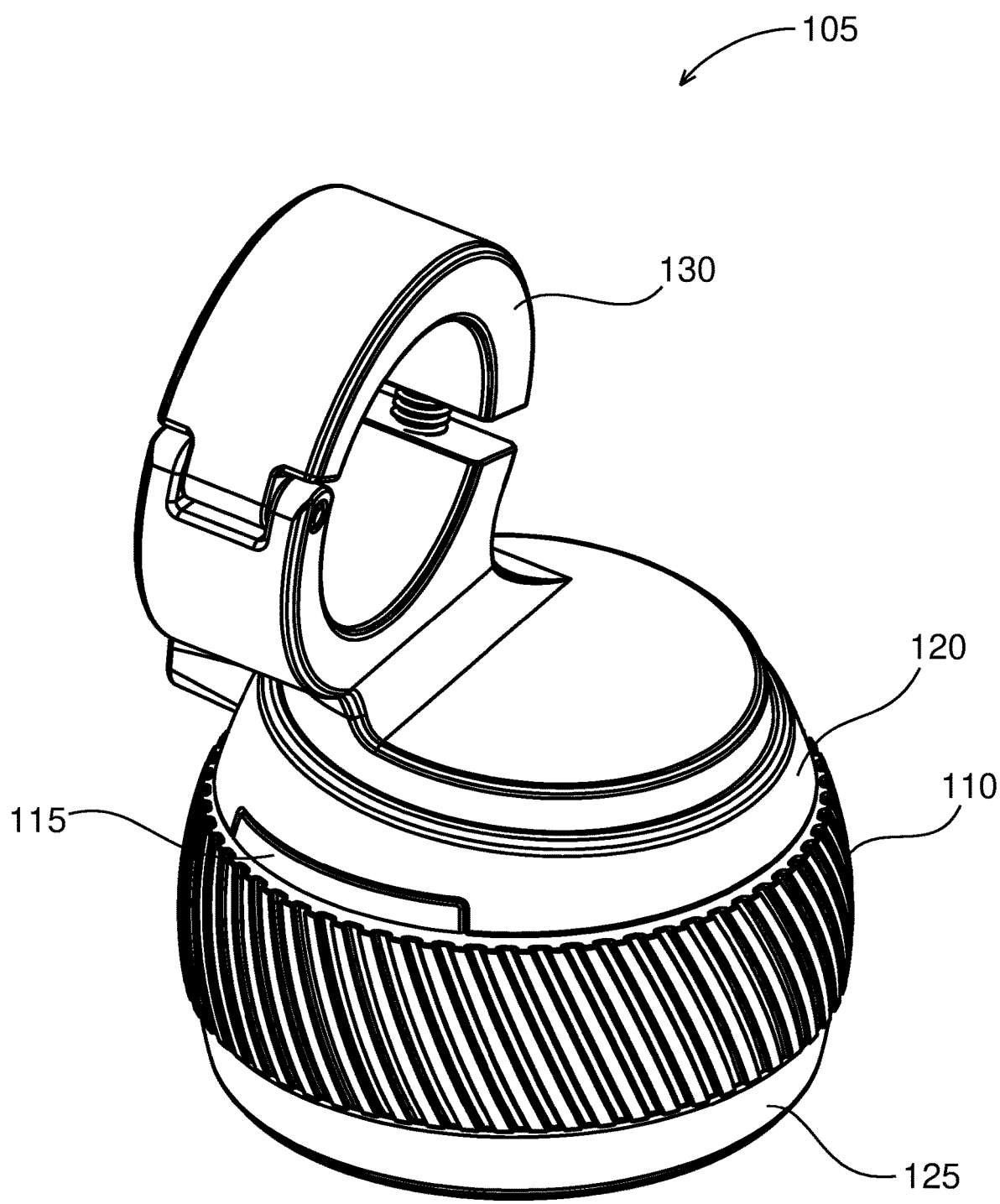
FIG. 1 illustrates an exemplary embodiment of a rotary transducer from a front perspective view.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

With new transportation devices emerging (e.g., electric scooters, electric bikes, electric motorcycles, etc.), there is a need for an improved throttle for controlling these new transportation devices as well as improving the experience for existing transportation devices. While the examples described herein are targeted toward electronic throttles, it is appreciated that this is one of a variety of use cases in which the rotatory transducer may be advantageously used. It is understood that the rotary transducer may be used in any embodiment where a user desires fine-tuned control of any output by varying an output electrical voltage based on a user selected input.

The present systems and methods describe a rotary transducer that outputs a unique voltage response based on the position the position of the rotary dial. In some embodiments, the rotary transducer uses two or more magnets positioned and arranged as described herein, in combination with one or more Hall effect sensors to provide the proper voltage response. As described here, the position and arrangement of the two or more magnets may be optimized to provide a linear voltage response across a defined range of motion. As described herein, a substantially linear voltage response may be achieved across at least a 72-degree range of motion, so that the output of the Hall effect sensor(s) may be directly used without any signal processing and/or signal filtering.

In some embodiments (e.g., throttle only), the voltage response of the rotary transducer may be used directly to control acceleration based on the output voltage level. In one embodiment, the Hall effect sensor may output between 0 and 5 volts depending on the magnetic field that is sensed, and the rotary dial may be configured to center at 0 volts. In such an embodiment, voltage readings from 0 volts to 5 volts may be used as a throttle to drive acceleration.

In other embodiments (e.g., bi-directional throttle), the voltage response of the rotary transducer may be divided to enable different responses to different voltage ranges. In one embodiment (e.g., acceleration/deceleration throttle), the Hall effect sensor may output between 0 and 5 volts depending on the magnetic field that is sensed, and the rotary dial may be configured to center at 2.5 volts. In such an embodiment, voltage readings from 2.51 volts to 5 volts may be used as a fine-tuned variable acceleration input (e.g., throttle) to drive acceleration while readings from 2.49 volts to 0 volts may be used as a fine-tuned variable deceleration input (e.g., negative throttle) to drive deceleration (e.g., through regenerative braking). The output of the rotary transducer (e.g., a resulting voltage level from the one or more Hall sensors) may be provided directly as an input to the control module (e.g., electronic motor controller, electronic speed controller), without any filtering, signal processing, or other signal manipulation.

In some embodiments, a visual output of the sensor readings may be provided for feedback to the user (successively increasing green bars (e.g., LED bars, using one or more Red Green Blue (RGB) LEDs, for example) for increasing acceleration and successively increasing red bars (e.g., LED bars, using one or more RGB LEDs, for example) for increasing deceleration, for example). In some embodiments, the housing of the sealed unit may act as a diffuser for light being emitted by the RGB LEDs.

The rotary transducer may have a rotary dial that is completely accessible around its circumference (e.g., accessible from all angles, 360 degrees of accessibility). This enables control from any angle around the circumference, which opens up entirely new methodologies for actuating the rotary transducer (e.g., with a thumb, using an index finger, using a side of a hand, etc.).

In some embodiments, the rotary transducer may be switched between two different modes, an acceleration only mode or a bi-directional acceleration/deceleration mode. It is appreciated that control modules are typically designed to operate in only a single mode at any given time (e.g., acceleration only mode or bi-directional acceleration/deceleration mode). Accordingly, the selection of the mode of the rotary transducer should be aligned with the corresponding mode of the control module for proper operation.

The rotary transducer is designed to operate in harsh environments, including under-water, in the rain, mud, sand, etc. This is because all electrical components, including the Hall effect sensor(s), are contained in a sealed unit, separate from the rotary dial, and it is a changing magnetic field, driven by the position and the arrangement of the two or more magnets in the rotary dial and the position of the rotary dial with respect to the sealed unit, that provides the principle of operation.

Referring now to the figures, FIG. 1 illustrates an exemplary embodiment of a rotary transducer 105 from a front perspective view. The rotary transducer 105 includes an upper housing 120, a rotary dial 110, and a lower housing 125. The rotary dial 110 sits between the upper housing 120 and the lower housing 125 and is rotatable with respect to the upper housing 120 and the lower housing 125 (which are affixed together, for example) as described more fully herein. An indicator window 115 may be positioned in or adjacent (e.g., in an integrated way, as shown) to the upper housing 120. The indicator windows 115 may facilitate the provision of visual feedback to the user (using lights, for example) of the output voltage being provided by the rotary transducer 105. The indicator window 115 may be coupled to/integrated into a sealed unit 205 as described hereafter.

The rotary transducer 105 may be coupled to a handlebar clamp 130 for mounting the rotary transducer 105 to a transportation device (e.g., electric scooter, electric bike, electric motorcycle, etc.). It is appreciated that the combination of the handlebar clamp 130 and the 360-degree circumferential access to the rotary dial 110 allows the rotary transducer to be positioned and used in numerous configurations (e.g., below a handlebar (as shown), above a handlebar, protruding frontward or backward from the handlebar, and countless other positions. This mounting flexibility may enable more comfortable throttle control, safer throttle control (avoid accidental throttle inputs, such as the death grip), and more opportunity for new ways of throttle control for increase accessibility.

Figure 2:
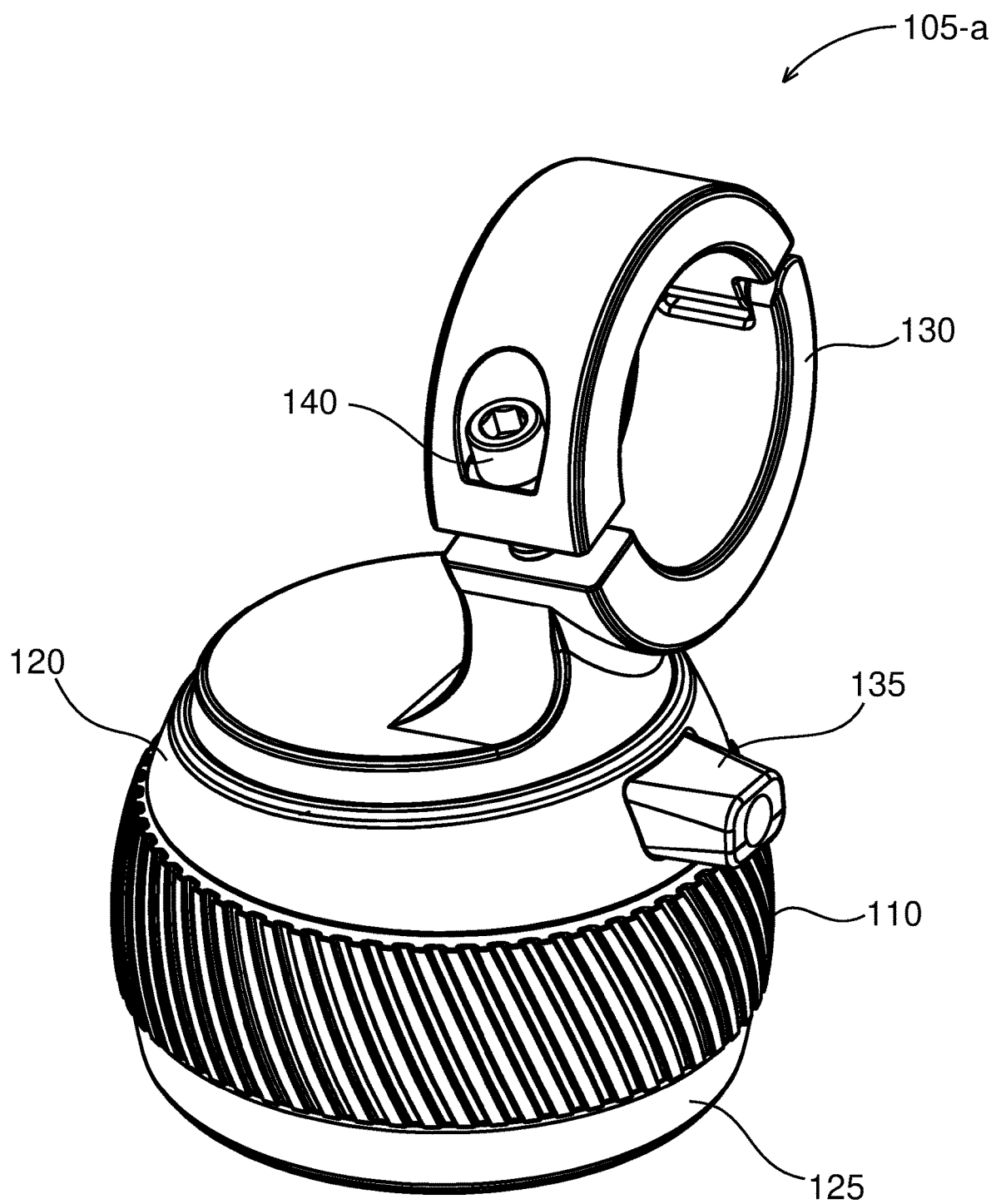
FIG. 2 illustrates an exemplary embodiment of a rotary transducer from a back perspective view.

FIG. 2 illustrates an exemplary embodiment of a rotary transducer 105-*a* from a back perspective view. In this embodiment, which is the back with respect to the embodiment 105, additional features of the rotary transducer are visible. As illustrated, the rotary transducer may further include a cable relief 135. The cable relief 135 may be part of the sealed unit 205 as described hereafter. The handlebar clamp 130 may additionally include a screw 140 for increasing/reducing the circumference of the handlebar clamp 130 for positioning and affixing the rotary transducer 105 to an object (e.g., a handlebar).

The rotary transducer 105 outputs a voltage based on the position of the rotary dial 110 and it is anticipated that the voltage would be transmitted to a control module via a physical wire. Accordingly, a wire may connect electronics (e.g., the Hall effect sensor) within the sealed unit 205 and the control module. The wire may pass through the cable relief 135 to seal and support the wire as it leaves the sealed unit 205. While the described embodiments consider a wired control (via an analog signal, for example) to a control module of a transportation device, it is appreciated that the voltage output may be sampled and digitized so that a digital signal may be provided (via wired or wireless communication) to the control module. In the case of wireless communication, the cable relief 135 may be omitted.

Figure 3:
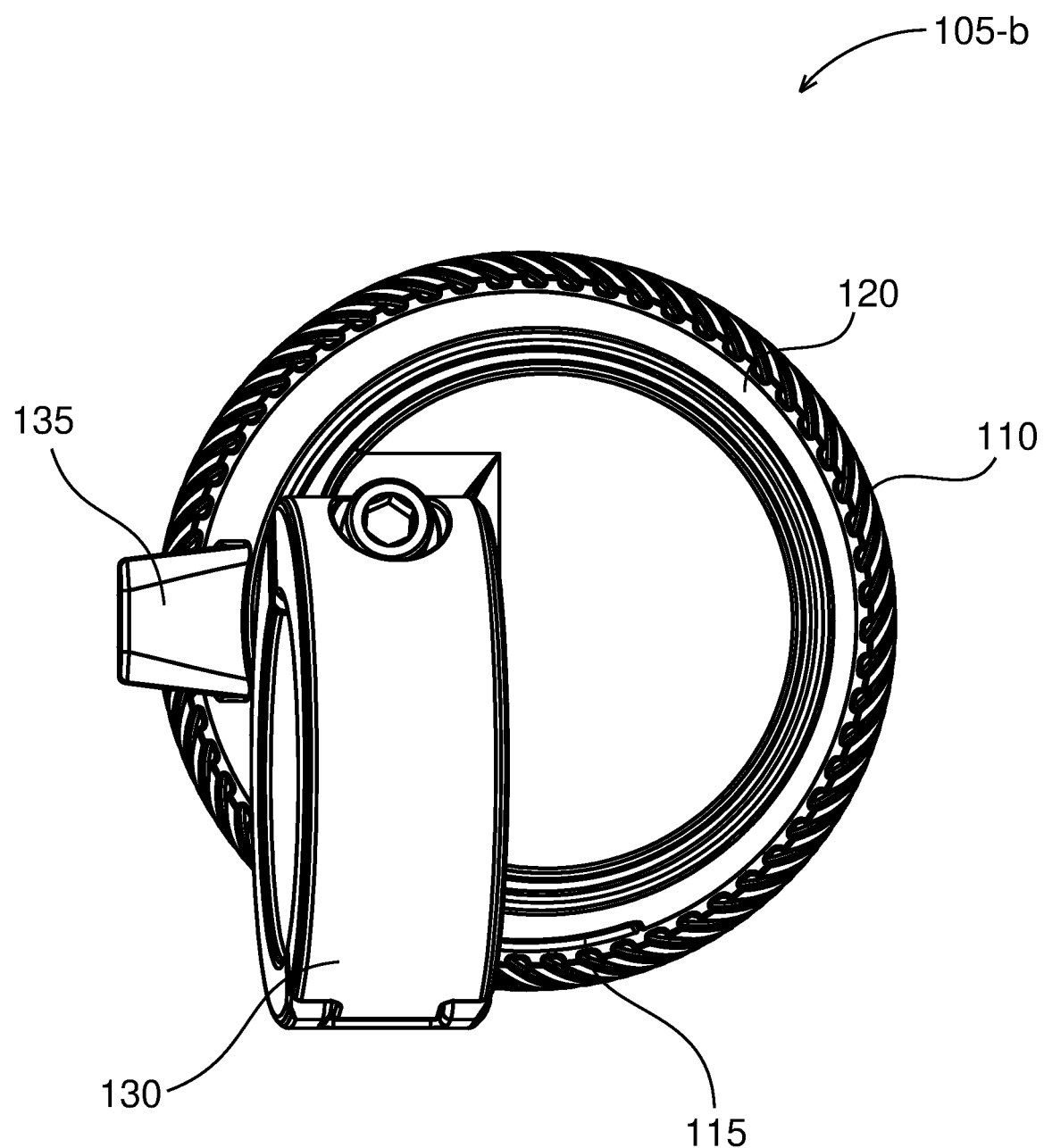
FIG. 3 illustrates an exemplary embodiment of a rotary transducer from a top view.

FIG. 3 illustrates an exemplary embodiment of a rotary transducer 105-*b* from a top view. As illustrated in FIG. 3, the indicator windows 115 may be visible by looking straight down on the rotary transducer 105.

Figure 4:
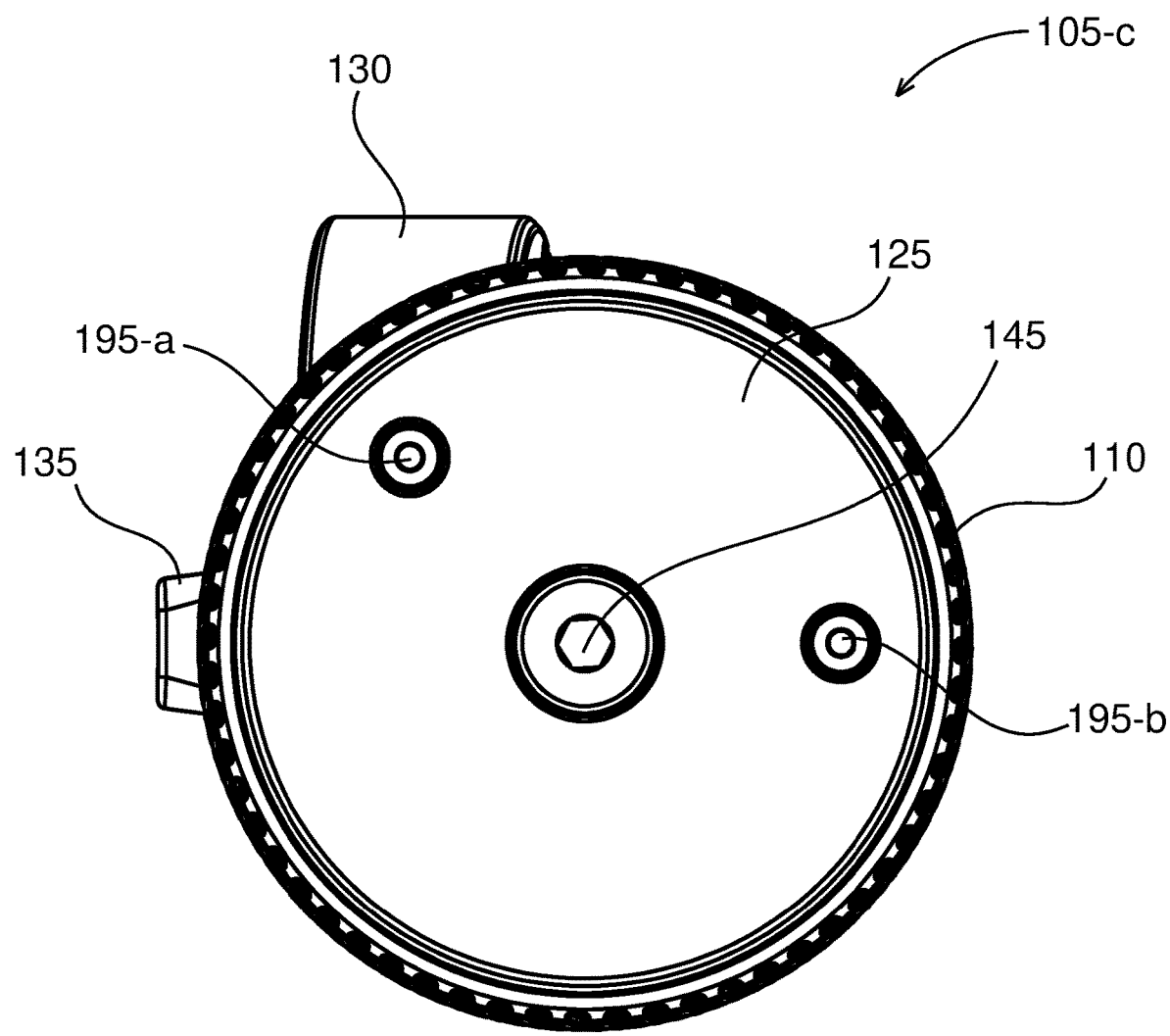
FIG. 4 illustrates an exemplary embodiment of a rotary transducer from a bottom view.

FIG. 4 illustrates an exemplary embodiment of a rotary transducer 105-*c* from a bottom view. As illustrated in FIG. 4, a bolt 145 may affix the lower housing 125 to the upper housing 120 while providing an axle around which the rotary dial 110 may rotate. In addition, the lower housing may include two strategically placed threaded holes that are configured to receive either of the mode selection screws 195-*a* and 195-*b*. As illustrated in FIG. 4, the mode selection screws 195-*a* and 195-*b* are positioned to place the rotary transducer 105 in one mode (e.g., throttle only mode), as described herein. The mode selection screws 195-*a* and 195-*b* may be switched (e.g., screw 195-*a* may be replaced with screw 195-*b* and screw 195-*b* may be replaced with screw 195-*a*) to change to the other mode (e.g., bi-directional acceleration/deceleration mode), as illustrated below.

Figure 5:
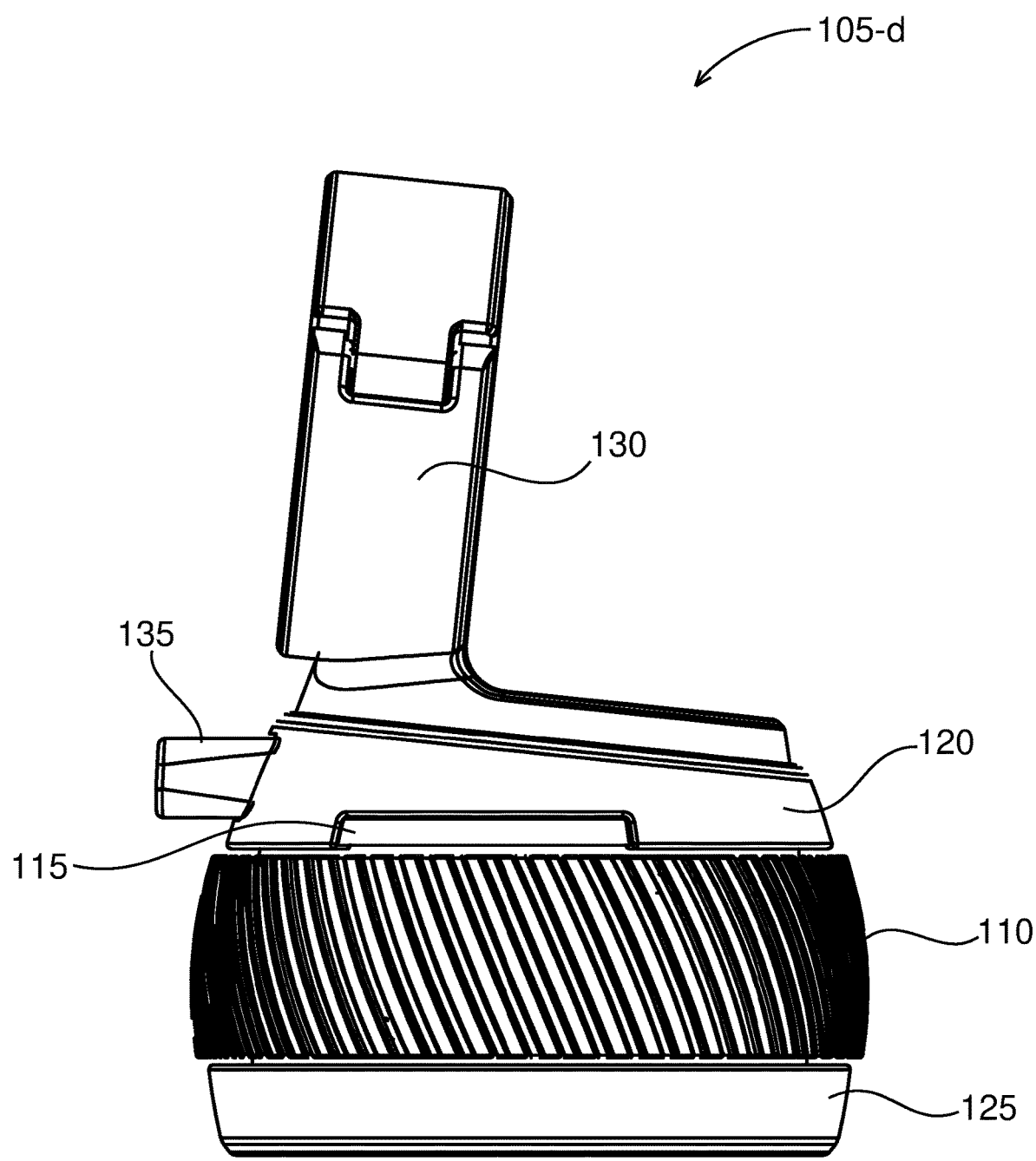
FIG. 5 illustrates another exemplary embodiment of a rotary transducer from a front view.
Figure 6:
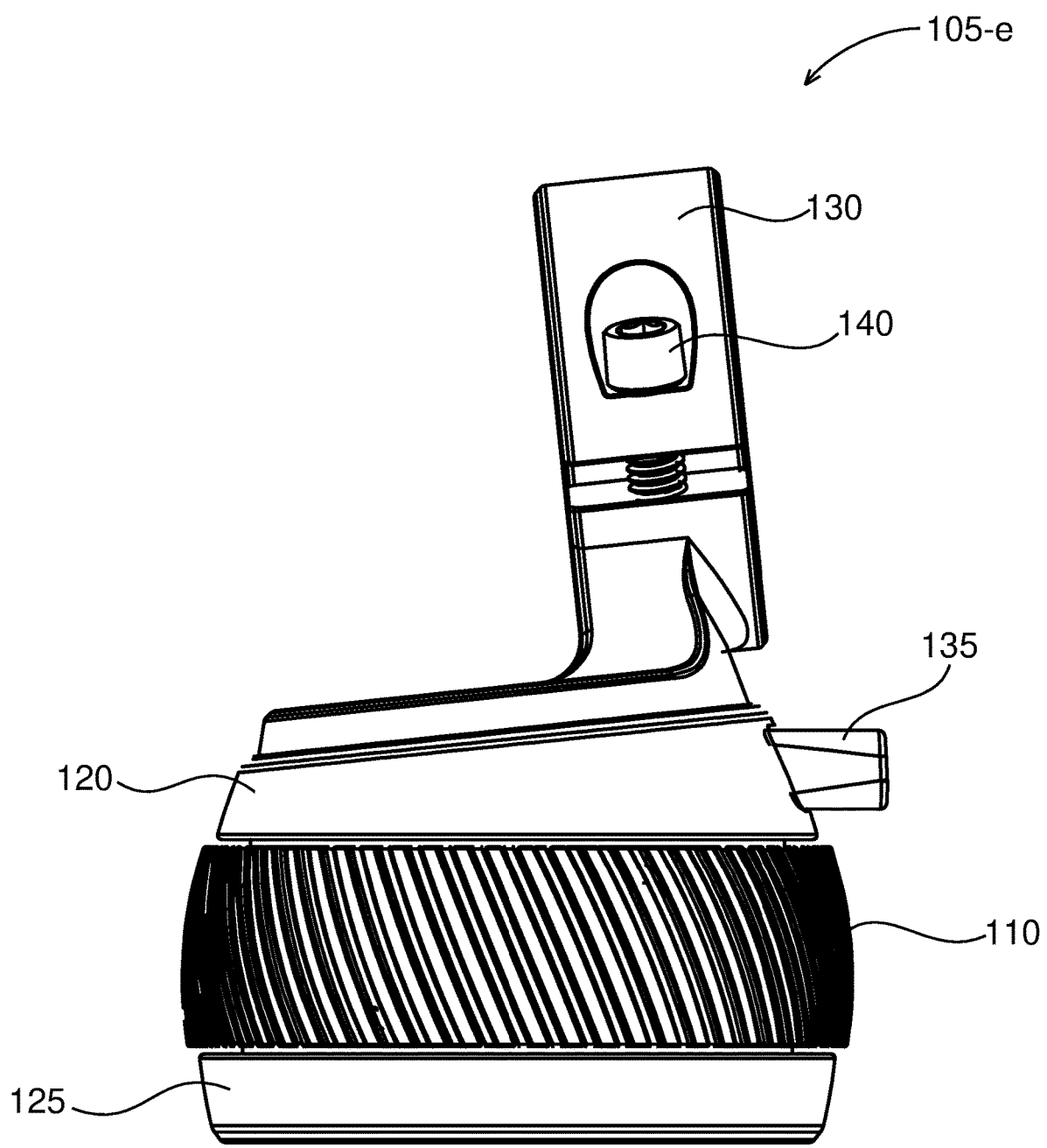
FIG. 6 illustrates another exemplary embodiment of a rotary transducer from a back view.

FIG. 5 illustrates an exemplary embodiment of a rotary transducer 105-*d* from a front view. FIG. 6 illustrates an exemplary embodiment of a rotary transducer 105-*e* from a back view. As illustrated in FIGS. 5 and 6, the upper housing 120 may be angled so that the top surface of the upper housing 120 is not slanted from one side to the other side. It is anticipated that the shape (e.g., relative slant) of the upper housing 120 may be optimized for mounting in different orientations, with different handlebar designs, and/or for desired ergonomics.

Figure 7:
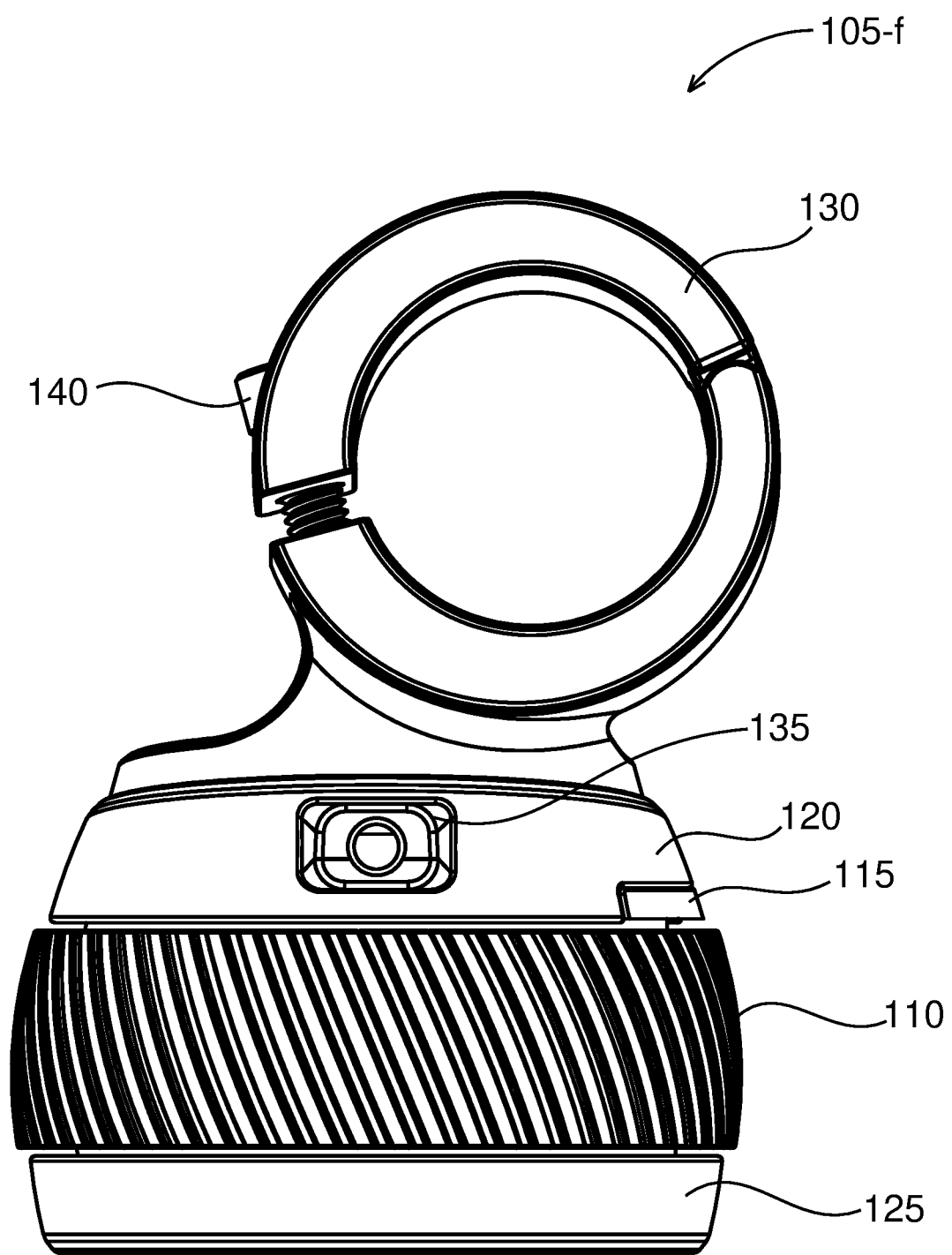
FIG. 7 illustrates an exemplary embodiment of a rotary transducer from a left side view.
Figure 8:
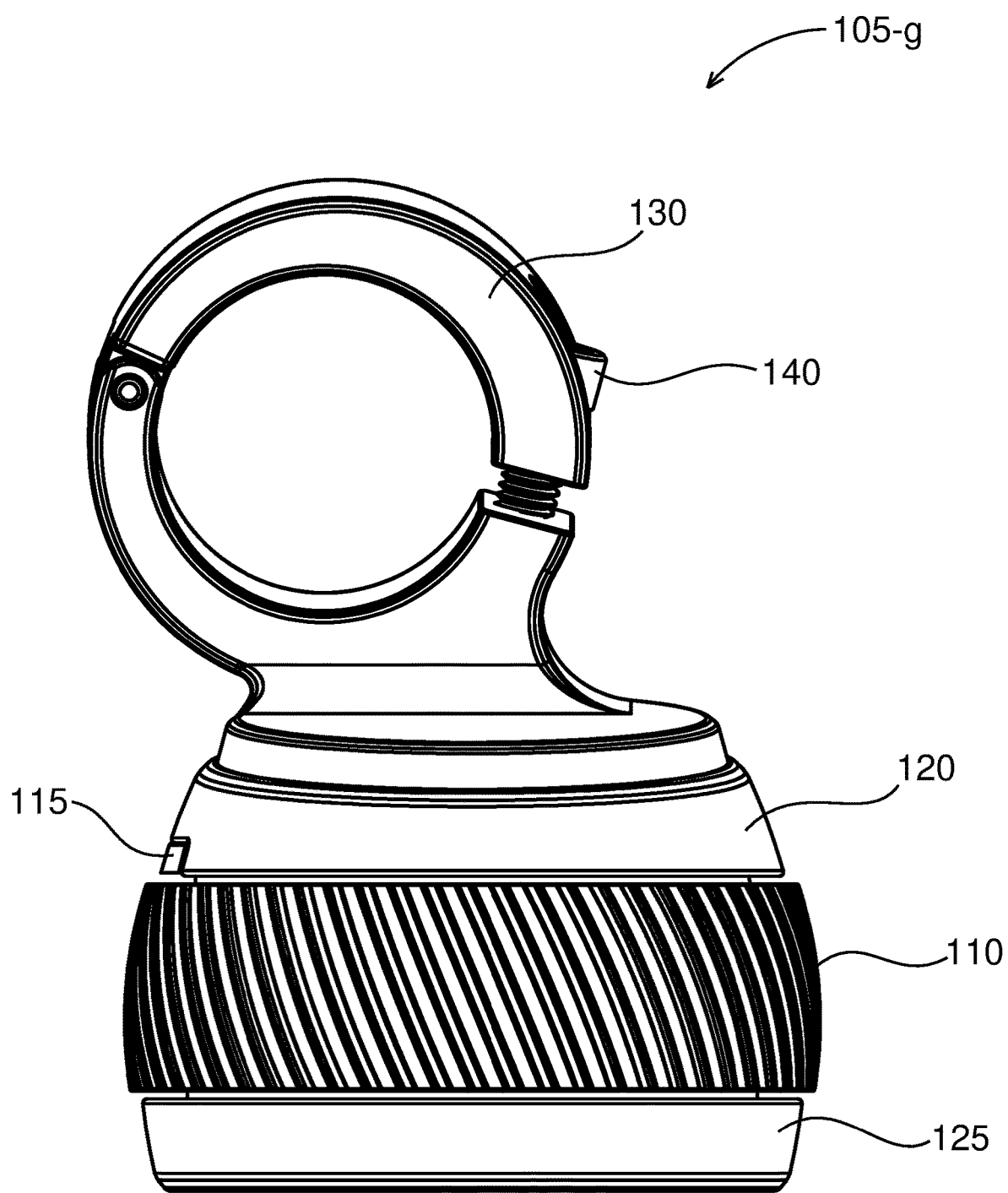
FIG. 8 illustrates an exemplary embodiment of a rotary transducer from a right-side view.

FIG. 7 illustrates an exemplary embodiment of a rotary transducer 105-*f* from a left side view. FIG. 8 illustrates an exemplary embodiment of a rotary transducer 105-*g* from a right-side view.

Figure 9:
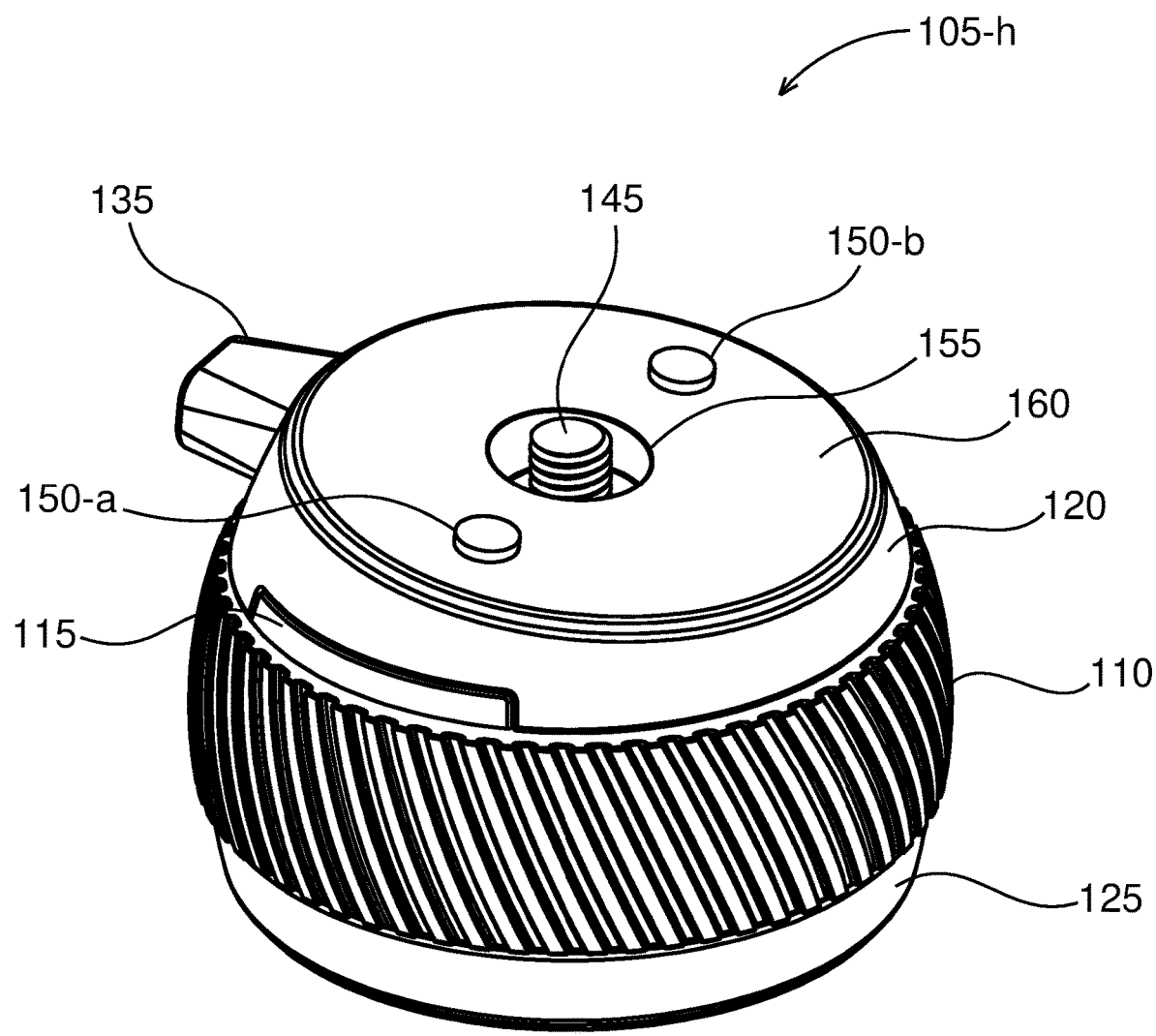
FIG. 9 illustrates an exemplary embodiment of a rotary transducer, without a handlebar clamp (e.g., handlebar clamp) or other mounting option from a front-side perspective view.

FIG. 9 illustrates an exemplary embodiment of a rotary transducer 105-*h*, without a handlebar clamp (e.g., handlebar clamp 130) or other mounting option from a front-side perspective view. As illustrated, the top surface 160 of the upper housing 120 may include one or more protrusions 150 (e.g., protrusions 150-*a* and 150-*b*) for interfacing with a mounting device (e.g., handlebar clamp 130) to ensure that the rotary device 105 is immovably affixed to the mounting device. In some embodiments, the rotary transducer 105 may be held together using a bolt 145. In some embodiments, the bolt 145 may also be used to attach a handlebar clamp (e.g., handlebar clamp 130) to the rotary transducer 105. The upper housing 120 may include a hole 155 through which the bolt 145 may pass through, as illustrated in FIG. 9.

Figure 10:
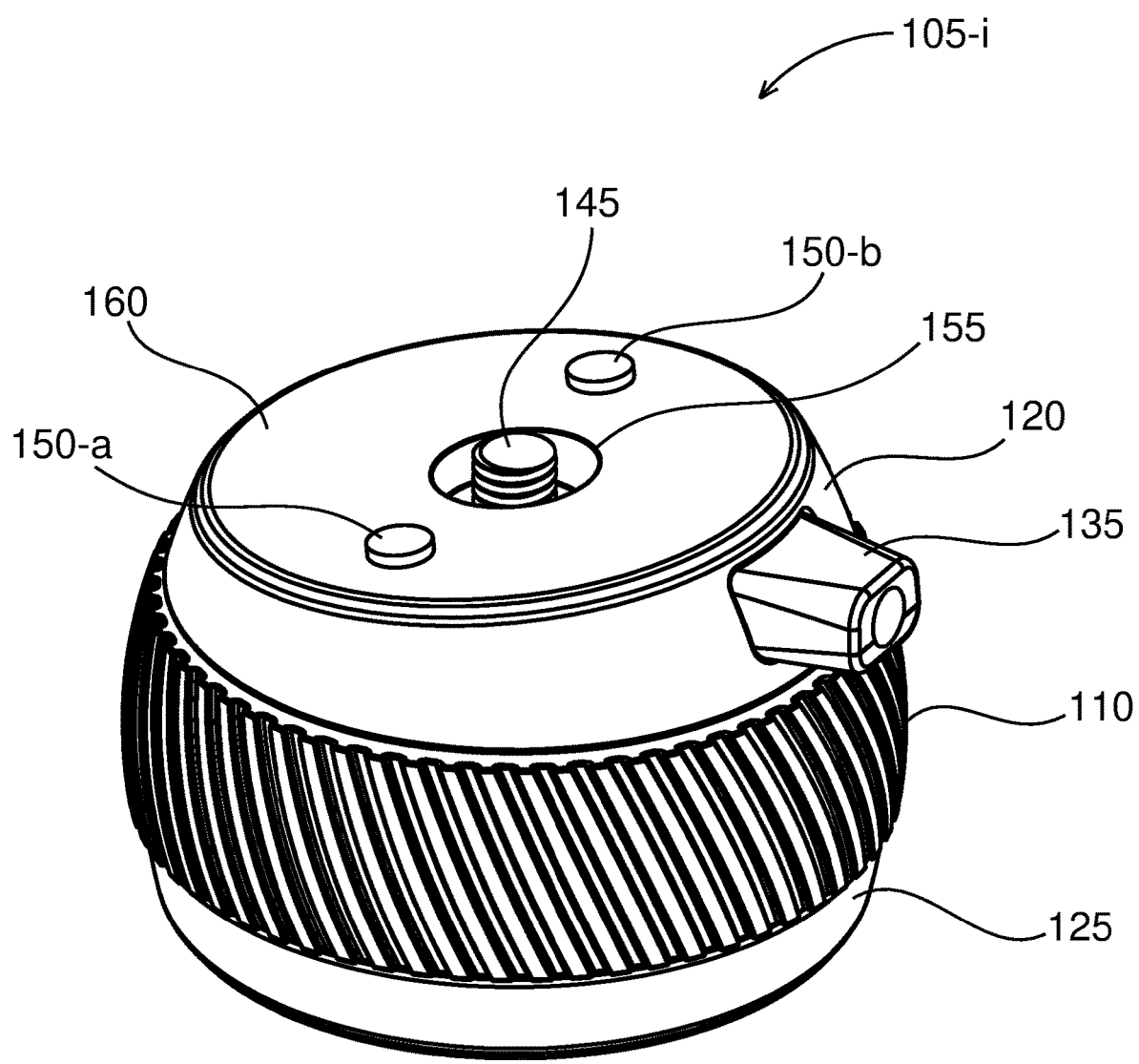
FIG. 10 illustrates an exemplary embodiment of a rotary transducer, without a handlebar clamp (e.g., handlebar clamp) or other mounting option from a back-side perspective view.

FIG. 10 illustrates an exemplary embodiment of a rotary transducer 105-*i*, without a handlebar clamp (e.g., handlebar clamp 130) or other mounting option from a back-side perspective view. As illustrated in FIG. 10, the cable relief 135 may pass through a hole within the upper housing 120.

Figure 11:
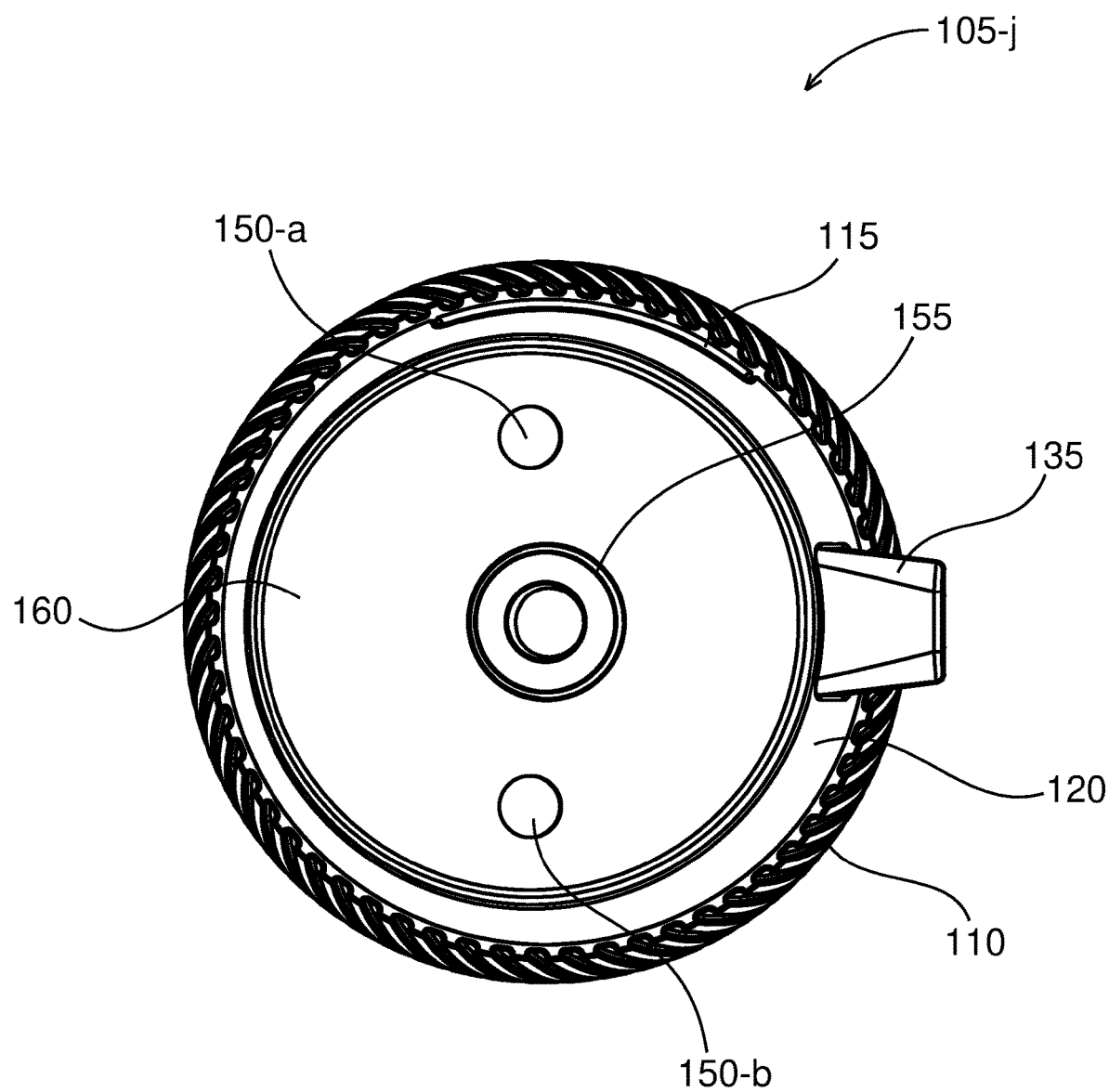
FIG. 11 illustrates an exemplary embodiment of a rotary transducer, without a handlebar clamp (e.g., handlebar clamp) or other mounting option from a top view.

FIG. 11 illustrates an exemplary embodiment of a rotary transducer 105-*j*, without a handlebar clamp (e.g., handlebar clamp 130) or other mounting option from a top view. As illustrated in FIG. 11, the upper housing 120 may include one or more protrusions 150-*a*, 150-*b*, to ensure that the rotary transducer 105 does not rotate with respect to a handlebar clamp 130 or other mounting hardware.

Figure 12:
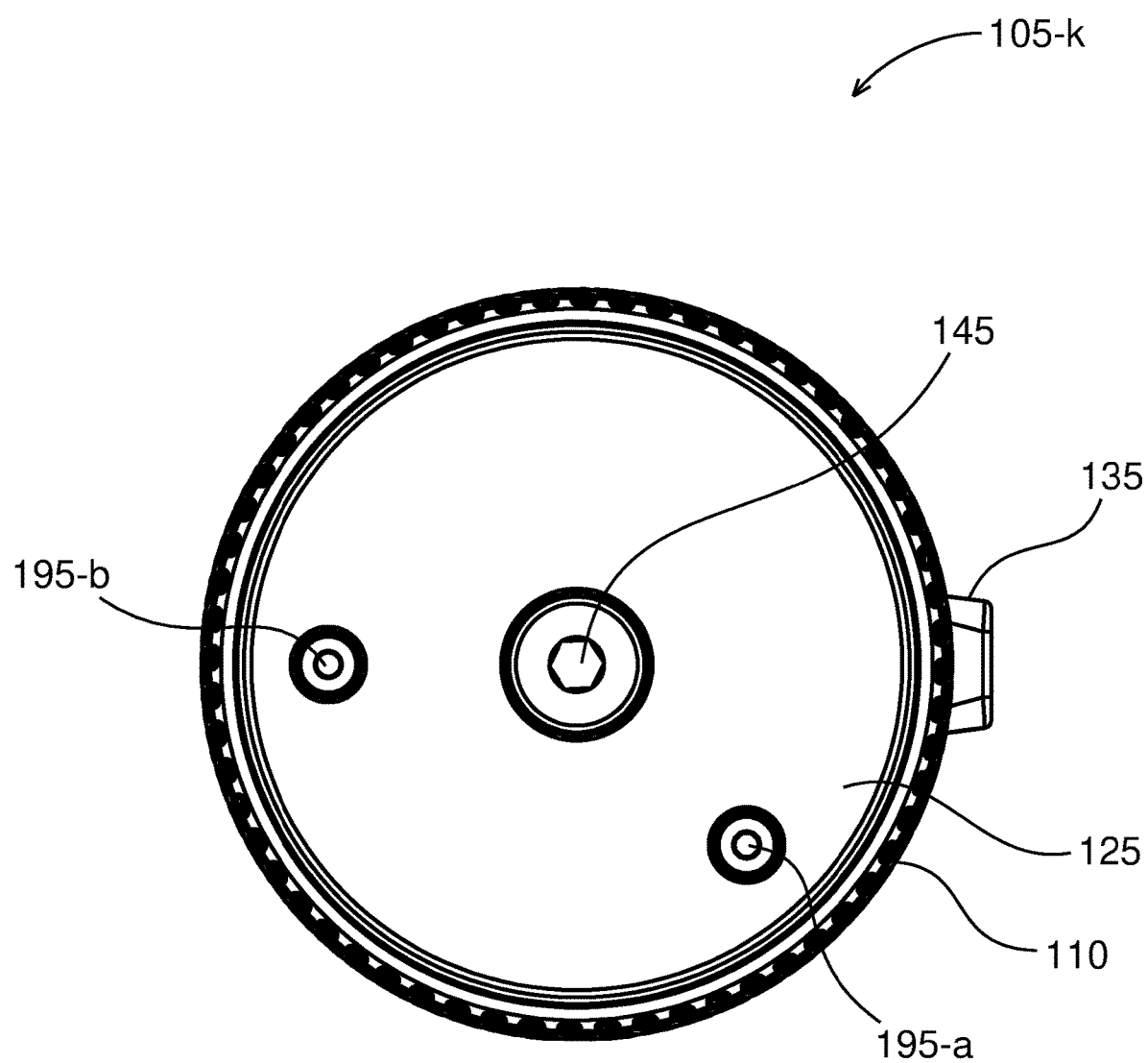
FIG. 12 illustrates an exemplary embodiment of a rotary transducer, without a handlebar clamp (e.g., handlebar clamp) or other mounting option from a bottom view.

FIG. 12 illustrates an exemplary embodiment of a rotary transducer 105-*k*, without a handlebar clamp (e.g., handlebar clamp 130) or other mounting option from a bottom view. In addition to the bolt 145, FIG. 12 illustrates one embodiment of the placement of the mode selection screws 195-*a*, 195-*b*. In some embodiments, the bottom housing 125 may be fixedly attached to the upper housing 120 in relationship to the one or more Hall effect sensors such that the placement of the mode select screws 195-*a*, 195-*b* appropriately interface (or appropriately avoid interfacing, for example) with the rotary dial 110 to effectuate mode selection between at least two modes.

Figure 13:
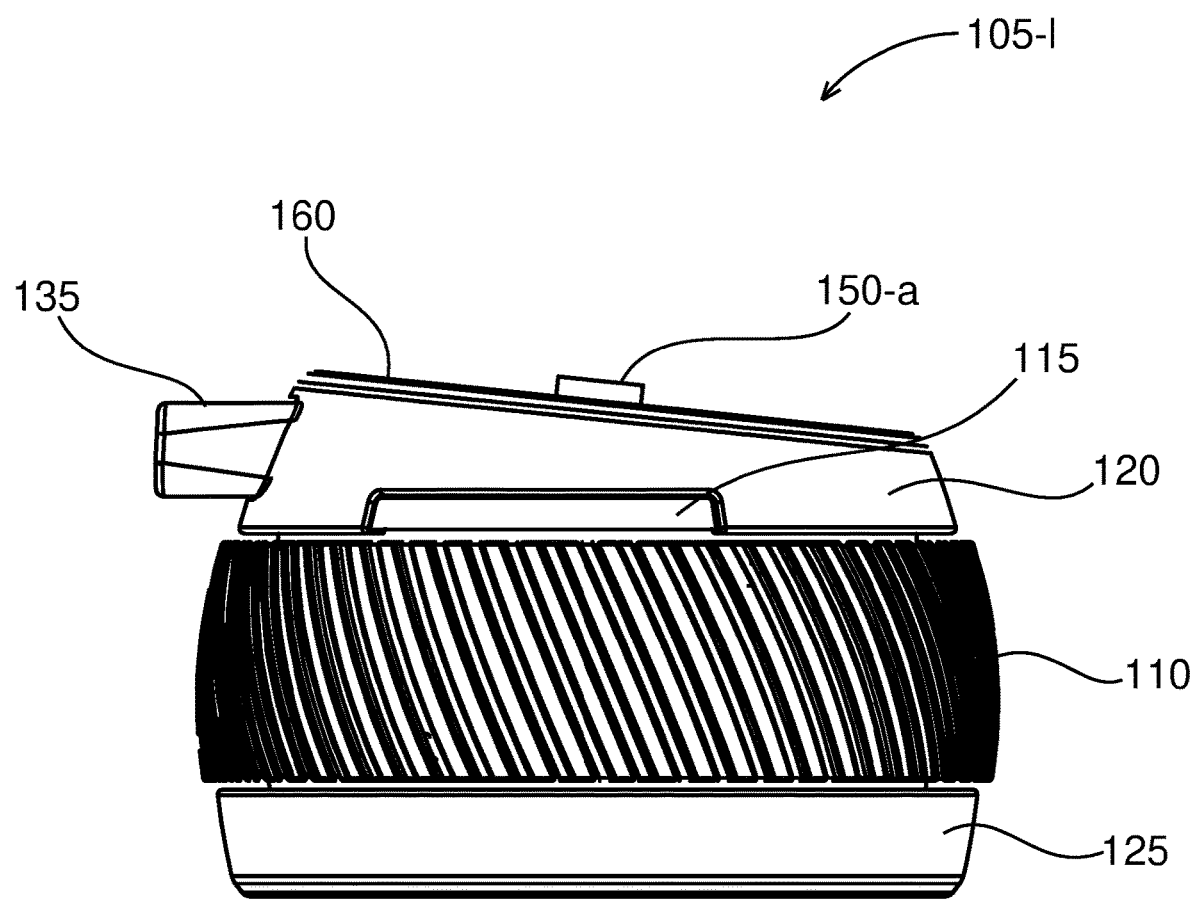
FIG. 13 illustrates an exemplary embodiment of a rotary transducer, without a handlebar clamp (e.g., handlebar clamp) or other mounting option from a front view.
Figure 14:
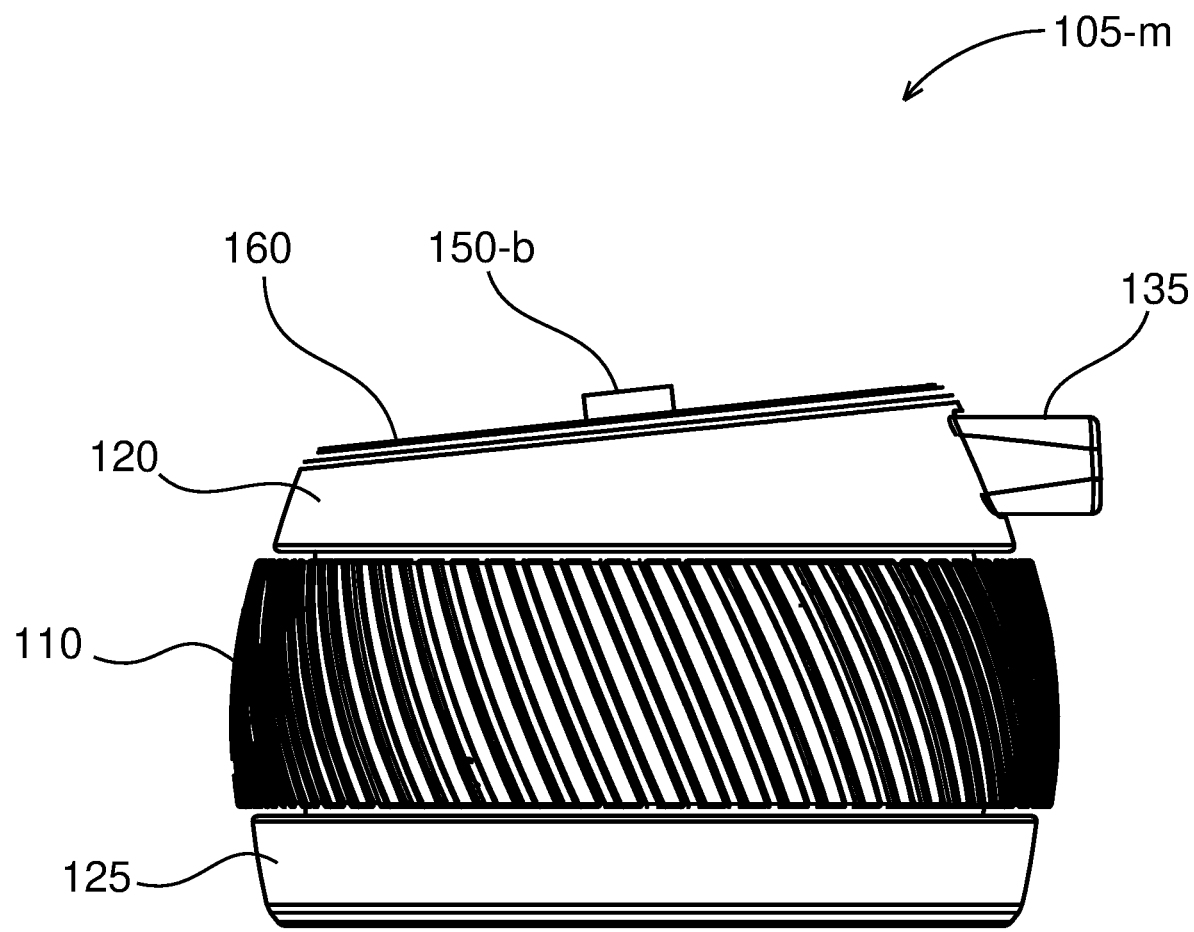
FIG. 14 illustrates an exemplary embodiment of a rotary transducer, without a handlebar clamp (e.g., handlebar clamp) or other mounting option from a back view.

FIG. 13 illustrates an exemplary embodiment of a rotary transducer 105-*l*, without a handlebar clamp (e.g., handlebar clamp 130) or other mounting option from a front view. In some embodiments, the rotary transducer 105 may be designed to be placed to the right of center on a handlebar so that the cable relief 135 extends towards center of the handlebar and so that the indicator window 115 is directly visible from the front view, as illustrated. FIG. 14 illustrates an exemplary embodiment of a rotary transducer 105-*m*, without a handlebar clamp (e.g., handlebar clamp 130) or other mounting option from a back view.

Figure 15:
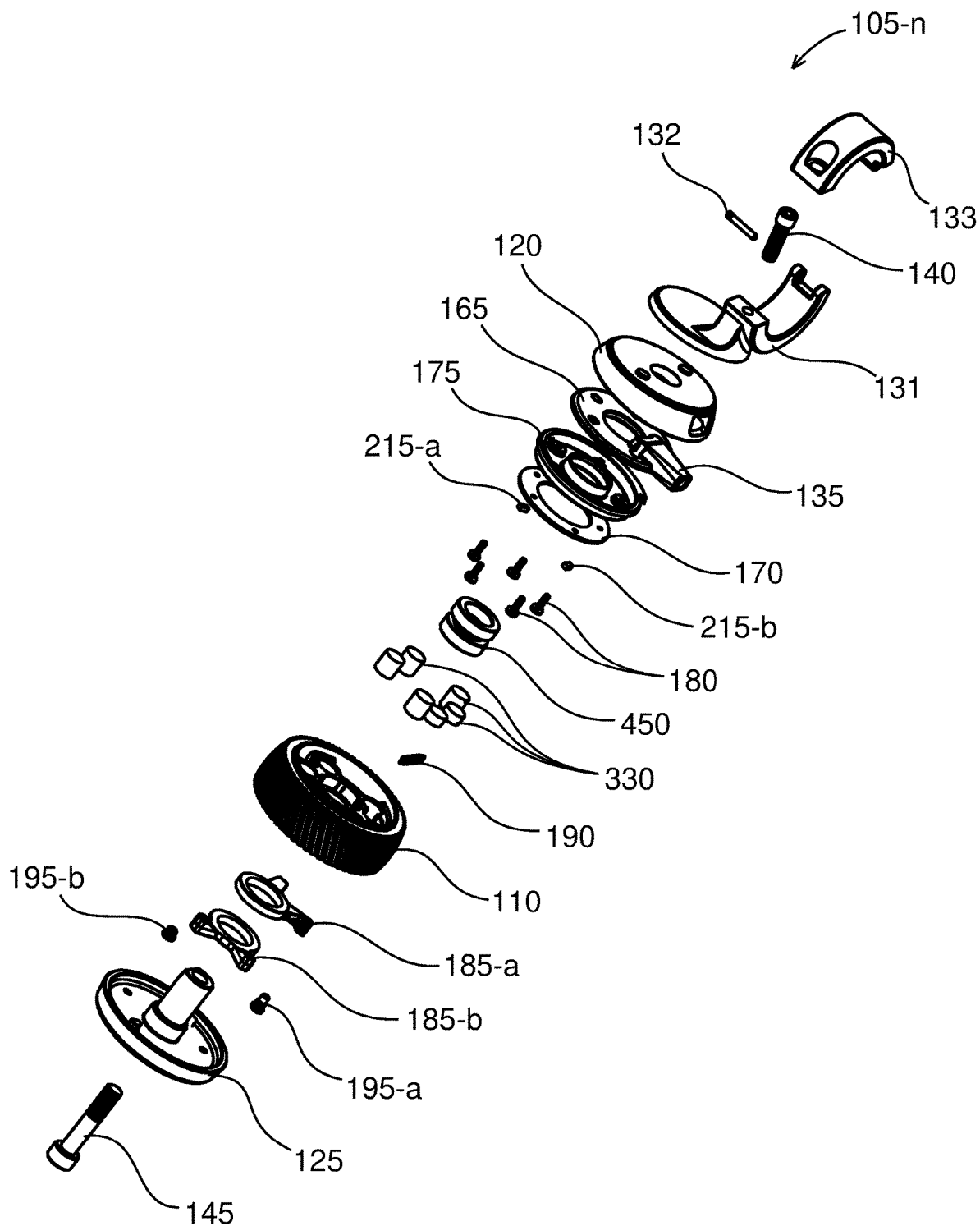
FIG. 15 illustrates an exploded view of an exemplary embodiment of a rotary transducer.

FIG. 15 illustrates an exploded view of an exemplary embodiment of a rotary transducer 105-*n*. As illustrated, the handlebar clamp 130 includes a bottom portion 131, a pin 132, a top portion 133, and a clamp screw 140. The top portion 133 may be rotatably connected to the bottom portion 131 using the pin 132 to enable the top portion 133 to open up and then to clamp down via the clamp screw 140 upon a bar (e.g., a handlebar), for easy installation. The clamp screw 140 may couple the top portion 133 to the bottom portion 131 and in combination with the pin 132 enables the inner circumference of the handlebar clamp 130 to be increased or decreased based on the position of the clamp screw 140. The bottom portion 131 may be affixed to the upper housing 120 using the bolt 145.

The rotary transducer 105 includes an upper housing 120, a sealed unit 205 (as discussed below), a spacer 450, one or more magnets 330, a rotary dial 110, an arm assembly 185 (e.g., arm assembly 185-*a*, 185-*b*), a spring 190, and the lower housing 125. As illustrated, the lower housing 125 includes a protruding cylinder that acts as an axle for the arms assembly 185, the rotary dial 110, and the spacer 145. As illustrated the lower housing 125 includes one or more protrusions 195-*a*, 195-*b* that, based on the mode selected, selectively engage with the arms assembly 185. The arm assembly 185 may interface and engage directly with the rotary dial 110 such that the arm assembly 185 in combination with the spring 190 and the features of the lower housing 125 (include any mode selection screws 195-*a*, 195-*b* as applicable, for example) work together to control rotation of the rotary dial 110 including centering of the rotary dial 110 at a particular point (as discussed in further detail below). This particular centering point is optimized in combination with the location of the one or more Hall effect sensors 215-*a*, 215-*b* and the one or magnets 330 to ensure that at a given rotation of the rotary dial results in the desired output voltage from the Hall effect sensors 215.

The arm assembly 185, the rotary dial 110 and the spacer 450 may all be rotatably affixed to an axial cylinder formed by the lower housing 125. In some embodiments, the axial cylinder may be lubricated to facilitate the rotation of the arm assembly 185, the rotary dial 110, and/or the spacer 450 around the axial cylinder.

As discussed below, the magnets 330 may be inserted and affixed into the rotary dial 110 in a strategic manner to create a desired magnetic field that will yield the proper voltage response as the rotary dial 110 rotates with respect to the one or more Hall effect sensors within the sealed unit 205.

The rotary dial 105 may be connected together as a single unit by the bolt 145. The bolt 145 may thread into the upper housing 120 to affix the upper housing 120 to the lower housing 125. In some embodiments, the lower housing 125 may engage with the upper housing 120 in a way that prevents the lower housing 125 from rotating or being misaligned from the upper housing 120. For example, the axial cylinder of the lower housing 125 may be notched, as illustrated, and the upper housing 120 may be correspondingly notched, not shown, to ensure proper alignment between the lower housing 125 and the upper housing 120. In some embodiments, the bolt 145 may additionally couple the handlebar clamp 130 to the rotary transducer 105.

The sealed unit 205 includes a top housing 165, a circuit board 170 (e.g., electronics package that includes one or more Hall effect sensors 215-a, 215-b), a bottom housing 175, and screws 180 (e.g., machine bolts) that join the top housing 165 and the bottom housing 170 to seal and encase the circuit board 170 to form the sealed unit 205. At least two of the screws 180 may thread into the upper housing 120 to couple the sealed unit 205 to the upper housing 120. In some embodiments, the protrusions 150, illustrated previously, correspond with the threaded receptacles that receive the screws 180 that thread into the upper housing 120.

Figure 16:
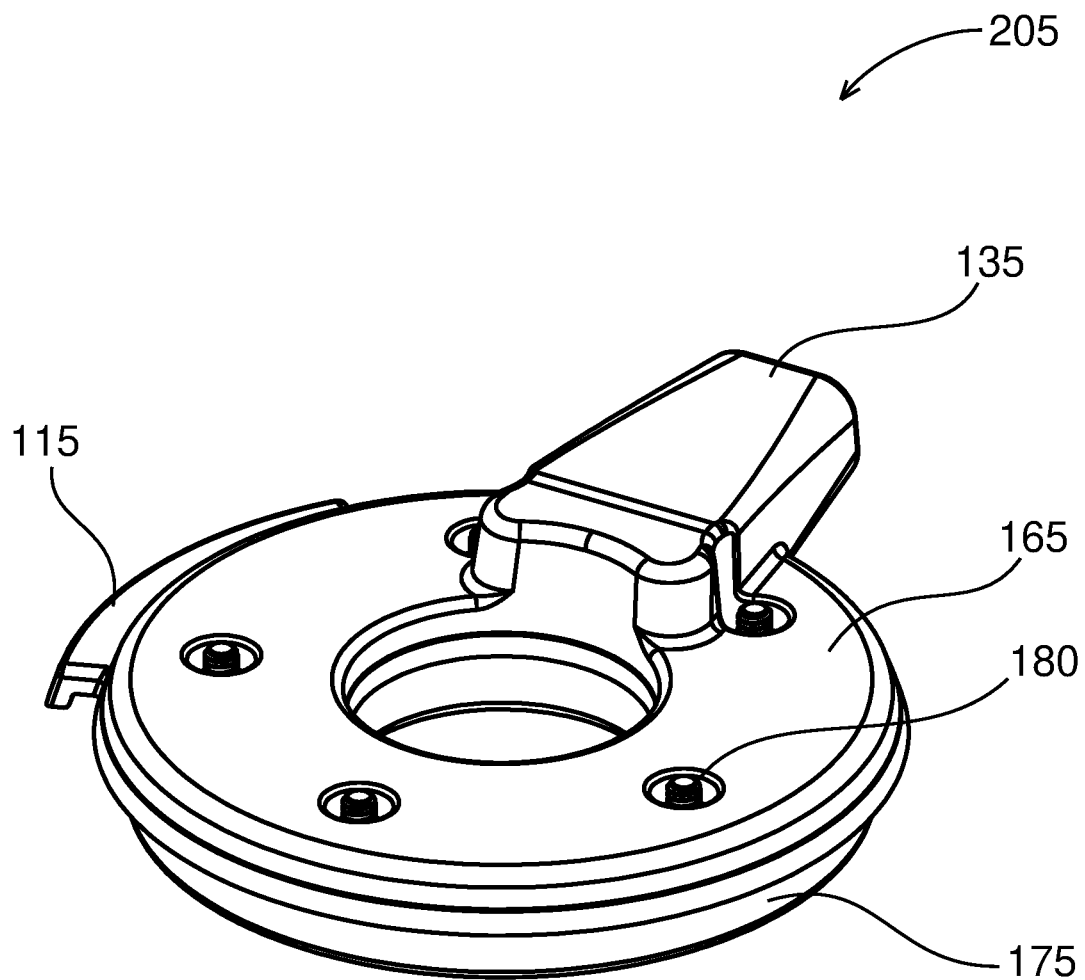
FIG. 16 illustrates an exemplary embodiment of a sealed unit from a perspective view.

FIG. 16 illustrates an exemplary embodiment of a sealed unit 205 from a perspective view. The sealed unit 205 includes a top housing 165 and a bottom housing 175 that is coupled together with screws 180 to form the sealed unit 205. The sealed unit 205 includes the circuit board (e.g., circuit board 170, or electronics package), which is not visible because it is sealed inside the sealed unit 205. In some embodiments, the protruding cable relief 135 and indicator window 115 orient and affix the sealed unit 205 in proper position with respect to the upper housing 120 (e.g., by the hole through which the cable relief 135 passes through the upper housing 120 and by the indent in the upper housing 120 to accommodate the indicator window 115, for example). The sealed unit 205, and specifically the bottom housing 175 includes the indicator windows 115. Although only one indicator window 115 is shown, it is appreciated that multiple indicator windows (e.g., indicator windows on opposites sides of the sealed unit 205) may be used to increase mounting options and/or usability. The indicator window 115 enables visual indicators (e.g., light emitting diodes (LEDs)) on the circuit board 170 to be visible outside of the sealed unit 205.

Figure 17:
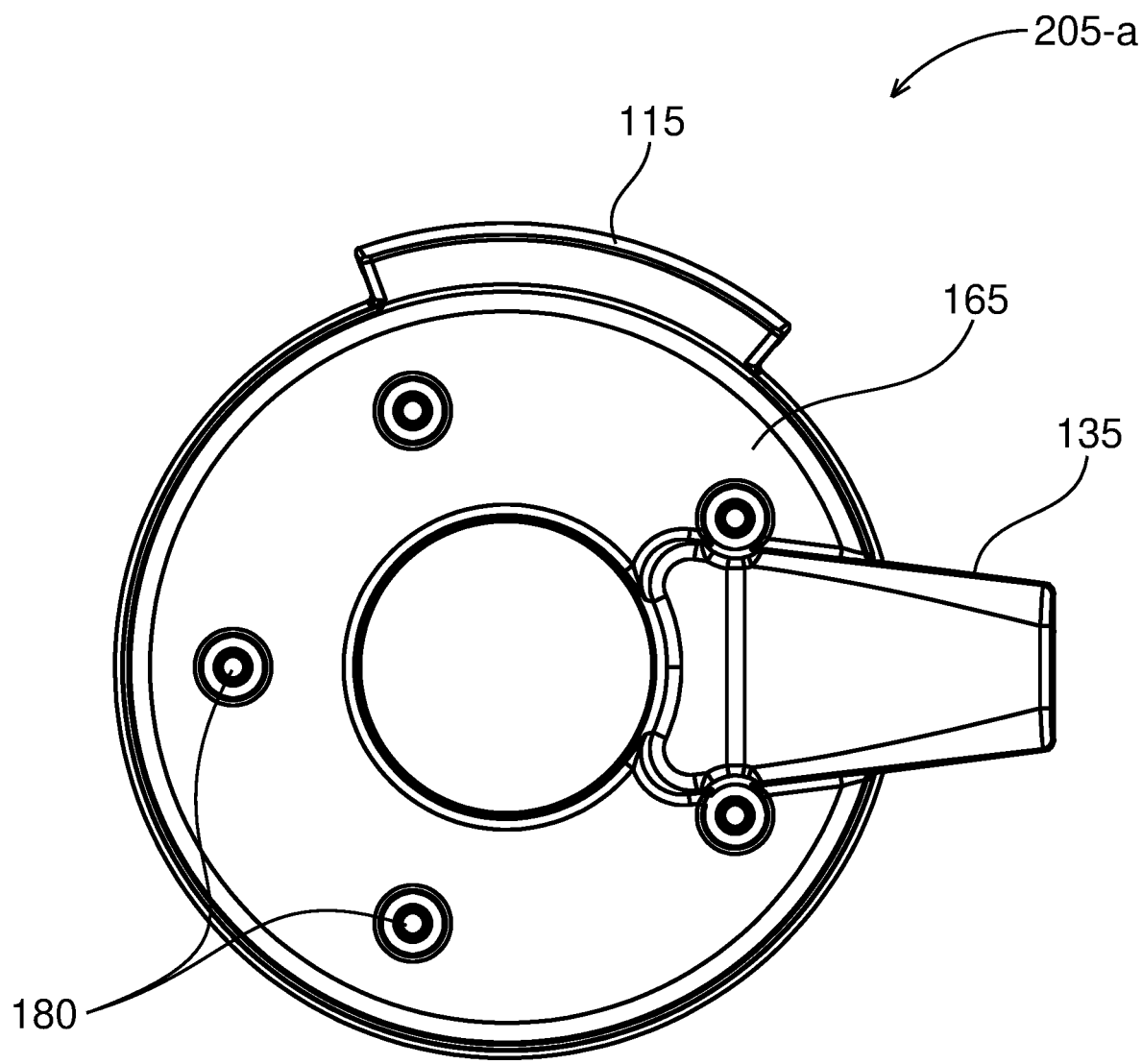
FIG. 17 illustrates an exemplary embodiment of a sealed unit from a top view.
Figure 18:
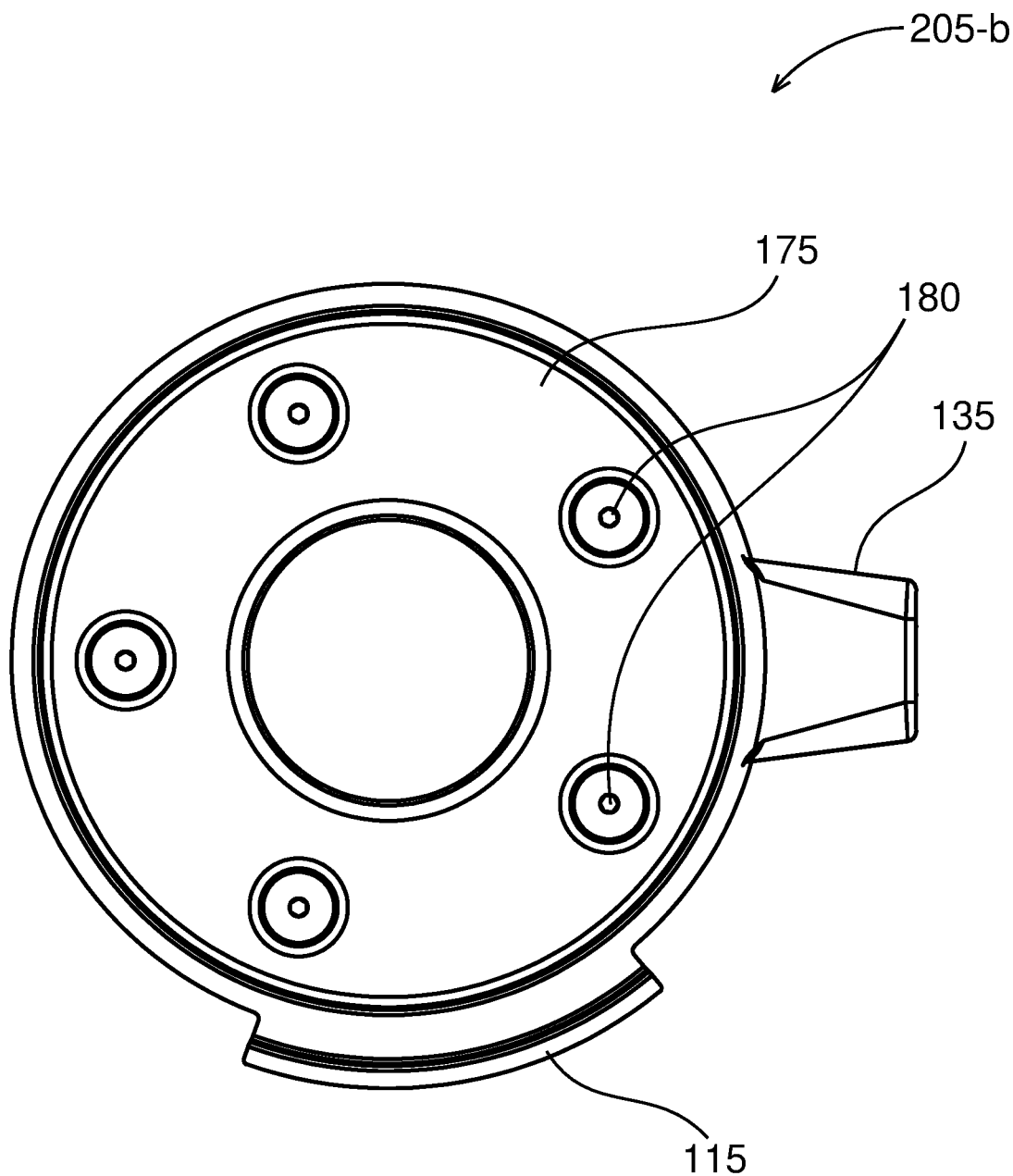
FIG. 18 illustrates an exemplary embodiment of a sealed unit from a bottom view.
Figure 19:
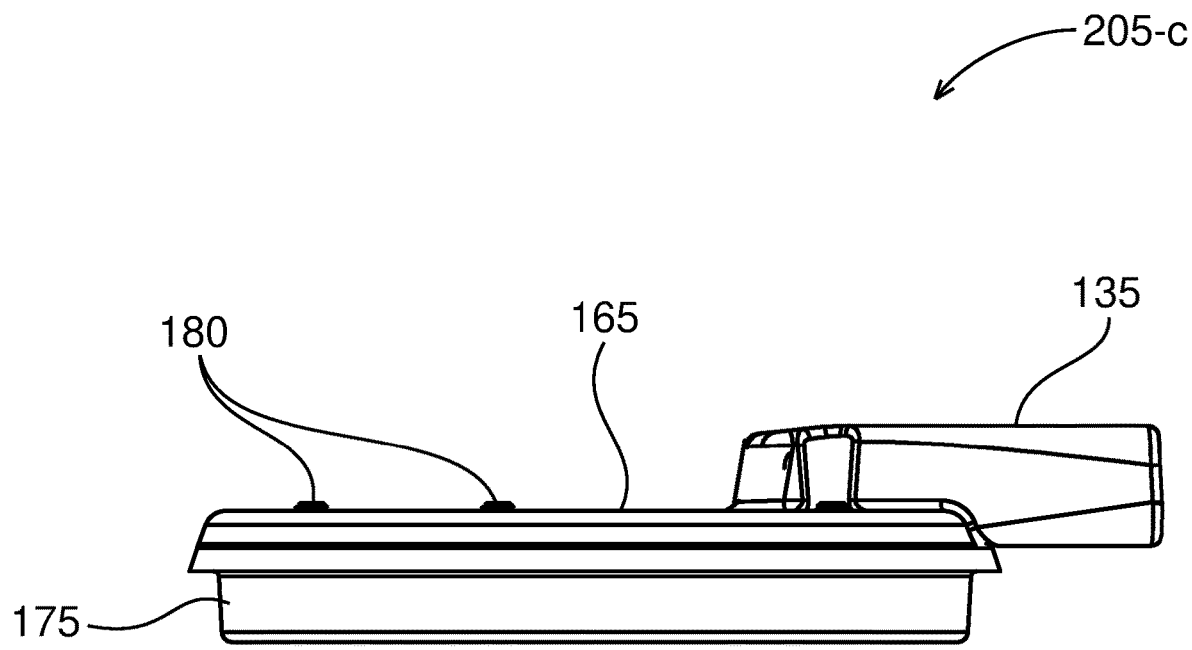
FIG. 19 illustrates an exemplary embodiment of a sealed unit from a back view.

FIG. 17 illustrates an exemplary embodiment of a sealed unit 205-a from a top view. FIG. 18 illustrates an exemplary embodiment of a sealed unit 205-b from a bottom view. FIG. 19 illustrates an exemplary embodiment of a sealed unit 205-c from a back view.

Figure 20:
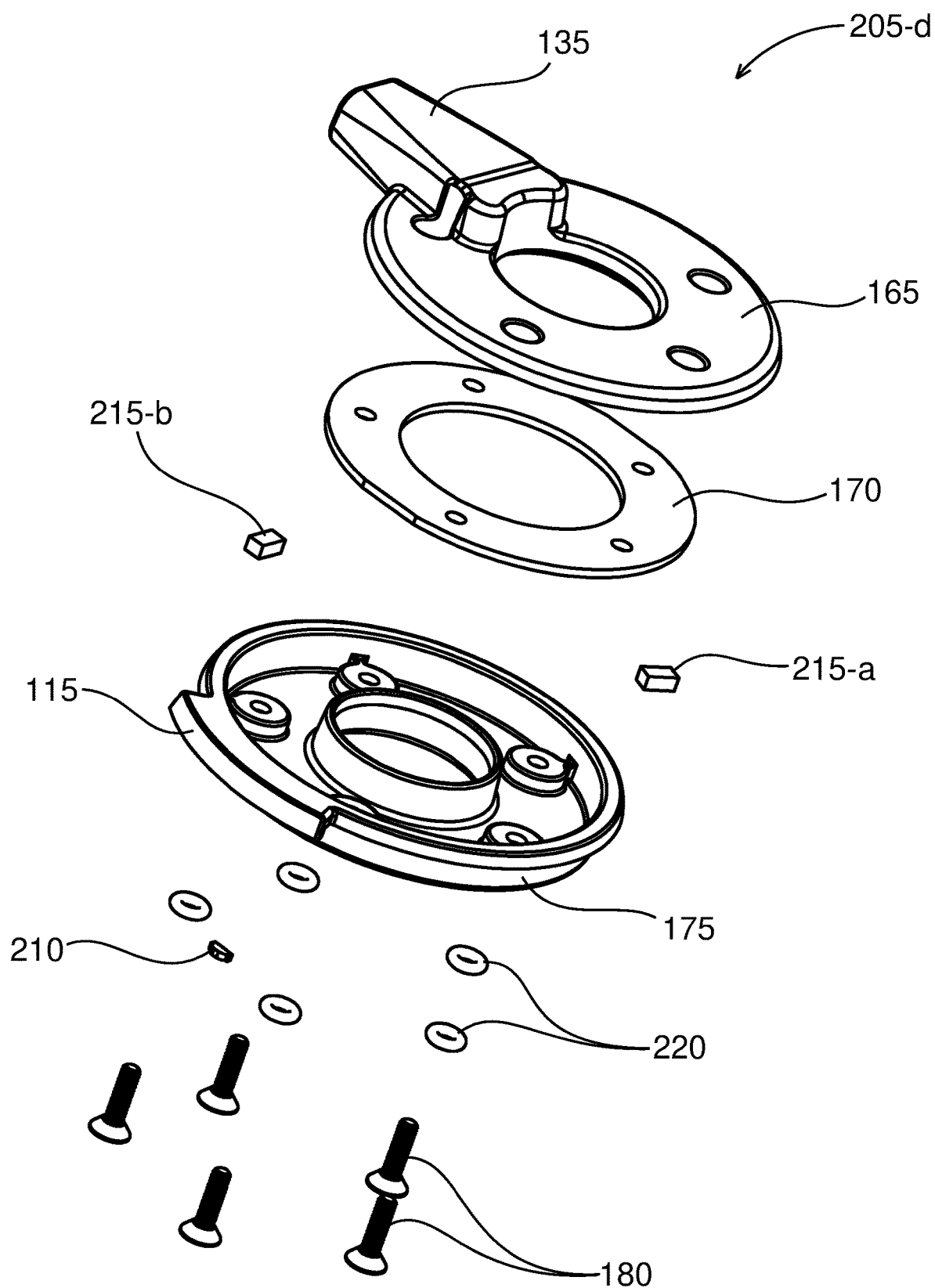
FIG. 20 illustrates an exploded view of a sealed unit.

FIG. 20 illustrates an exploded view of a sealed unit 205-d. The sealed unit 205 includes the top housing 165, which includes the cable relief 135 (or wire relief, for example), the circuit board 170, and the bottom housing 175. As illustrated the circuit board 170 sits within the bottom housing 175. In some embodiments, one or more of the screws 180 pass through the circuit board 170 to affix it in place. In some embodiments, one or more gaskets 220 may be used in combination with the screws 180 to ensure that the sealed unit 205 is impervious to water, mud, dirt, and contaminants. The circuit board 170 may include one or more Hall effect sensors 215-a, 215-b, which detect the magnetic field produced by the magnets 330. In addition to the Hall effect sensors 215-a, 215-b, the circuit board 170 may include one or more light emitting diodes 210 (e.g., LEDs 210) as well as LED driving circuitry, power management circuitry, Hall effect sensor circuitry and the like. The LED 210 may be a reg green blue (RGB) LED that can produce multiple colors (e.g., green for acceleration or red for deceleration). The positioning of the Hall effect sensors 215-a, 215-b is important as it impacts the placement and the arrangement of the magnets (e.g., magnets 330). It is appreciated that the sealed unit 205 may be completely sealed because the magnetic fields may easily pass through the sealed unit 205, including the bottom housing 175, without any disruption.

Figure 21:
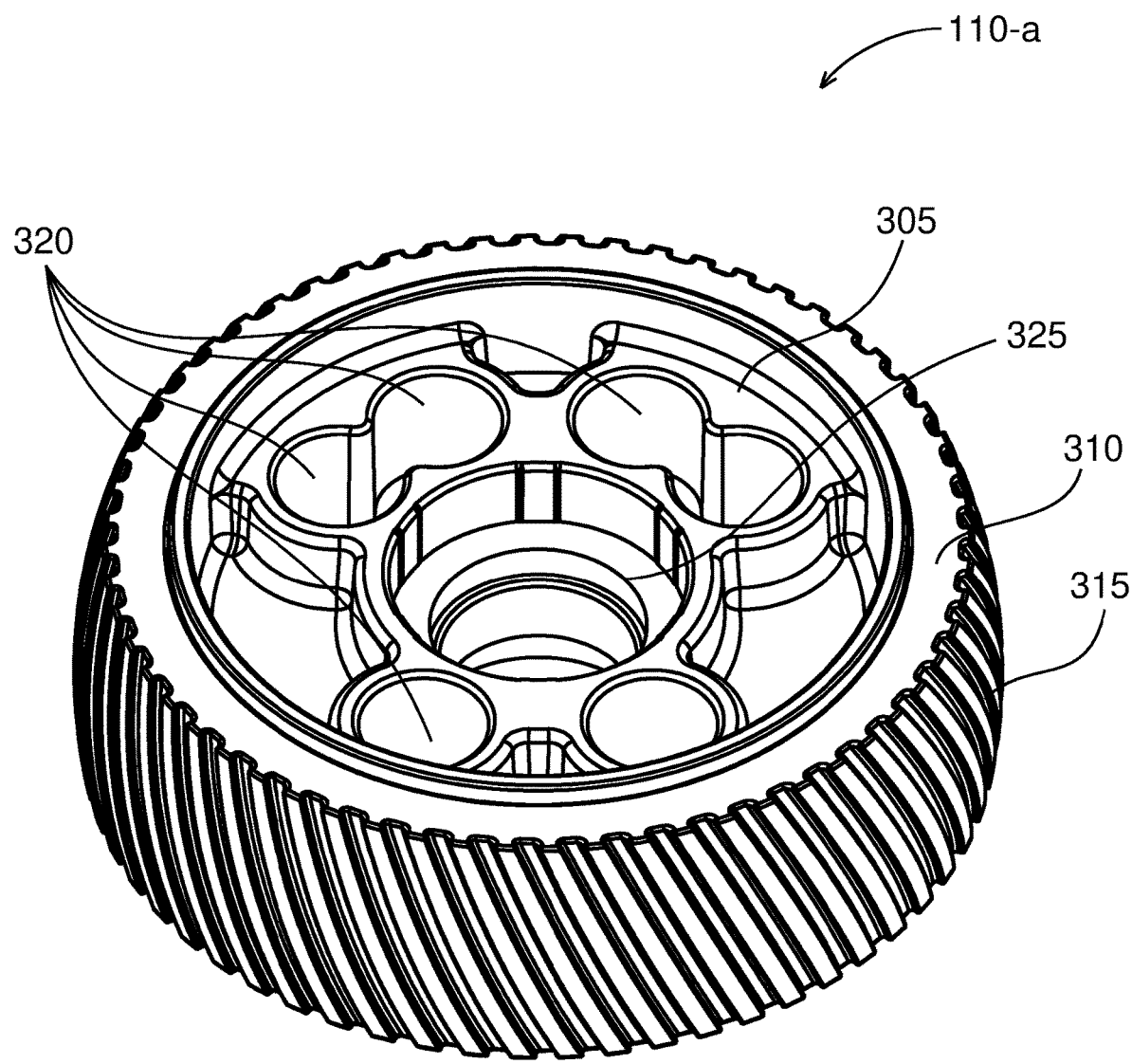
FIG. 21 illustrates an exemplary embodiment of a rotary dial from a perspective view.

FIG. 21 illustrates an exemplary embodiment of a rotary dial 110-a from a perspective view. The rotary dial 110 may be cylindrical or somewhat spherical as defined by the dial body 310. The dial body is designed so that the outer circumference 315 is exposed as a user input device. The outer circumference 315 may include a texture, such as angled ridges, as shown, to improve the user experience. In some embodiments, the outer circumference 315 may be a skin (e.g., silicon wrap) that goes on an outside surface defined by the dial body 310. In other embodiments, the outer circumference 315 and any texture thereto may be part of the dial body 310. The rotary dial 110 may include a center opening 325 for interfacing with the axial cylinder protruding from the lower housing 125. As discussed herein, the axial cylinder from the lower housing 125 passes through the center opening 325 of the rotary dial 110 and provides an axis of rotation that the rotary dial 110 may rotate around.

The dial body 310 includes a top surface 305 that may be recessed with respect to the outside surface defined by the dial body 310. The top surface 305 may include more than one recessed pockets 320 (e.g., six recessed pockets, as illustrated) for holding magnets (e.g., magnets 330). The placement of these recessed pockets 320 may be optimized in combination with the magnetic strength and position of the magnets within the recessed pocket 320.

Figure 22:
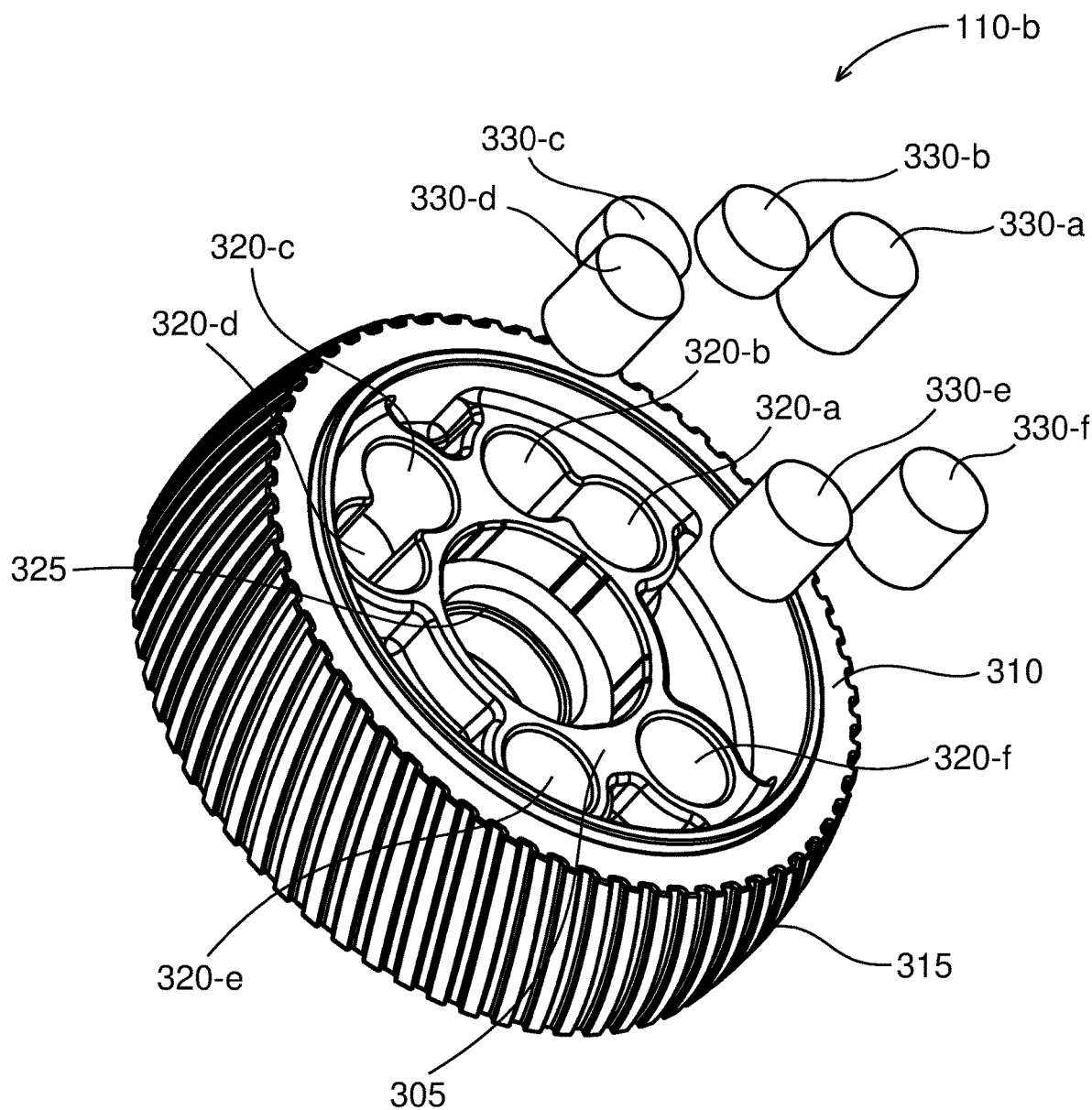
FIG. 22 illustrates an exemplary embodiment of a rotary dial with multiple magnets prior to the placement of the magnets within the rotary dial from a perspective view.

FIG. 22 illustrates an exemplary embodiment of a rotary dial 110-b with multiple magnets 330 prior to the placement of the magnets 330 within the rotary dial 110. Each of the recessed pockets 320-a, 320-b, 320-c, 320-d, 320-e, and 320-f are configured to hold the corresponding magnets 330-a, 330-b, 330-c, 330-d, 330-e, and 330-f in particular position and at a particular orientation so as to create the desired magnetic field arrangement that will cause the desired voltage response from the Hall effect sensors based on the movement of the rotary dial 110. As illustrated in FIG. 22, the magnets may be arranged in pairs with magnets 330-a and 330-d acting as a pair, magnets 330-b and 330-c acting as a pair, and magnets 330-e and 330-f acting as a pair. It is appreciated that each pair of magnets 330 may be unique with respect to size, magnetic strength, and/or magnetic polarization. For example, the pair of magnets 330-b and 330-c may be smaller in size (e.g., height and/or magnetic strength) than the pair of magnets 330-a and 330-d. In general, each pair of magnets 330 may be oriented with opposite magnetic polarization (e.g., if one of the magnets 330 within the pair is oriented N/S then the other magnet 330 within the pair is oriented S/N).

Figure 23:
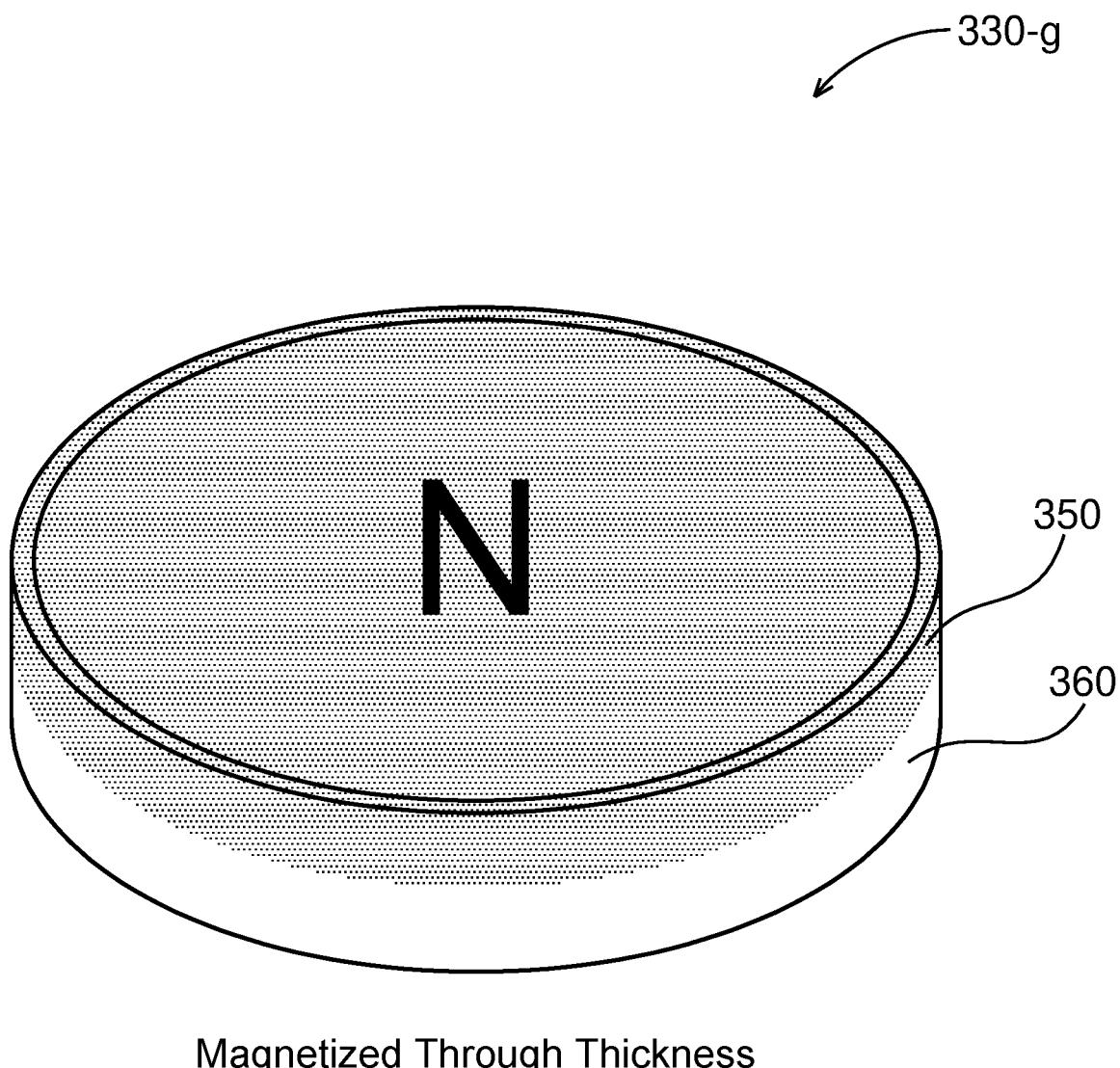
FIG. 23 illustrates an exemplary embodiment of a magnet from a perspective view.

FIG. 23 illustrates an exemplary embodiment of a magnet 330-g. It is appreciated that a magnet 330 may be magnetized with different magnetic polarizations. As illustrated in, magnet 330 may be a cylinder in shape. As a cylinder, the magnet 330 includes a cylindrical axis. As illustrated in FIG. 23, that magnet 330 may be magnetized through its thickness.

In this embodiment, the magnet 330 is a cylindrical magnet that is magnetized such that the North pole 350 polarization and the South pole polarization 360 are aligned (i.e., coaxial) with the cylindrical axis of the magnet 330. In some embodiments, the magnets 330 may be magnetized through its thickness as illustrated in FIG. 23.

Figure 24:
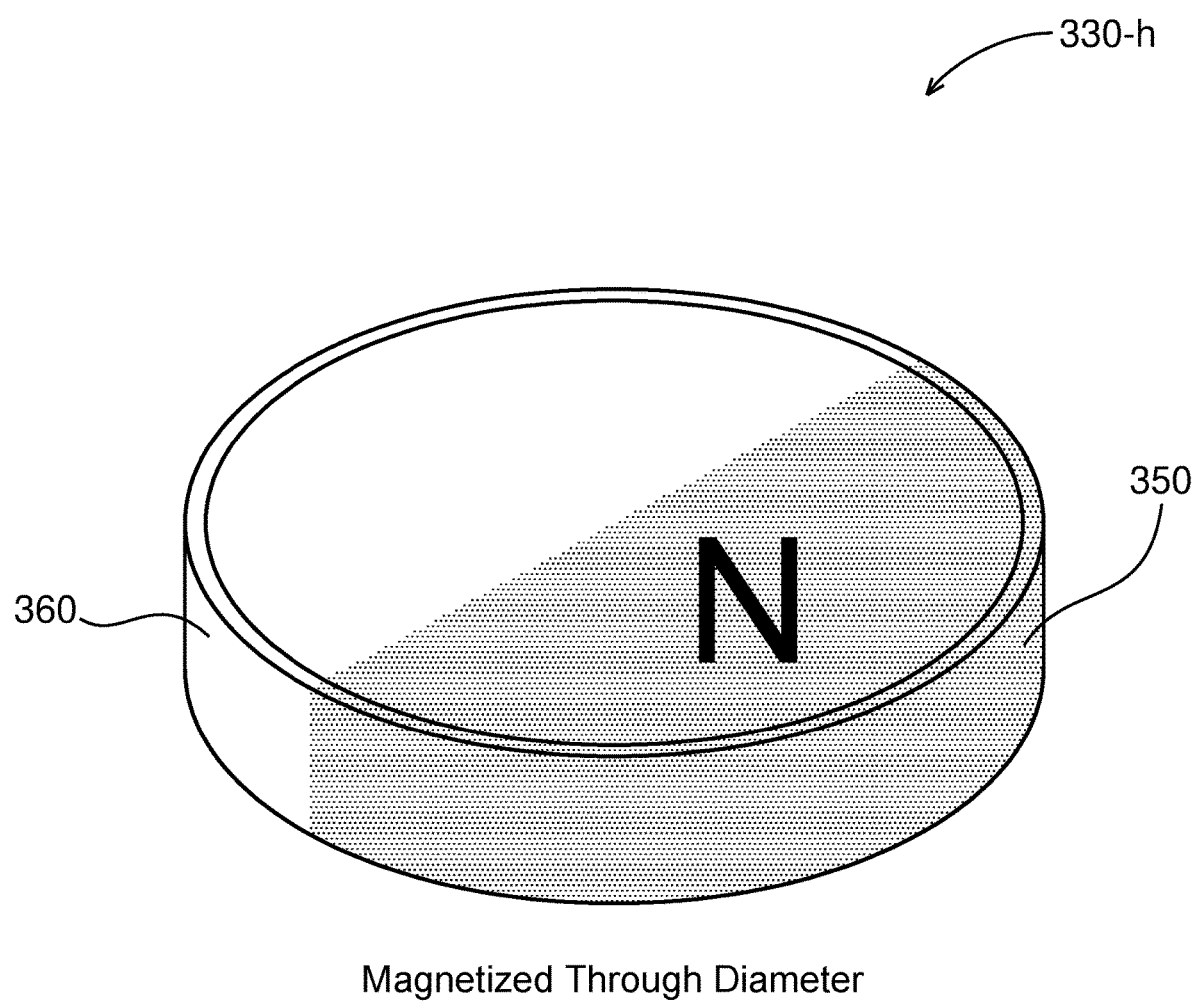
FIG. 24 illustrates an exemplary embodiment of a magnet that is magnetized through its diameter from a perspective view.

FIG. 24 illustrates an exemplary embodiment of a magnet 330-h that is magnetized through its diameter. In this embodiment, the magnet 330 is a cylindrical magnet that is magnetized such that the North pole 350 polarization and the South pole polarization 360 are perpendicular (i.e., orthogonal) with the cylindrical axis of the magnet 330. In some embodiments, the magnets 330 may be magnetized through its diameter as illustrated in FIG. 24. It is appreciated that the selection of polarization of the magnet 330, whether magnetized through its thickness as illustrated in FIG. 23 or magnetized through is diameter as illustrated in FIG. 24, is based on the desired magnetic field that will be produced by the combination of magnets 330 (e.g., the combination of magnetic fields produced by the combination of magnets 330).

Figure 25:
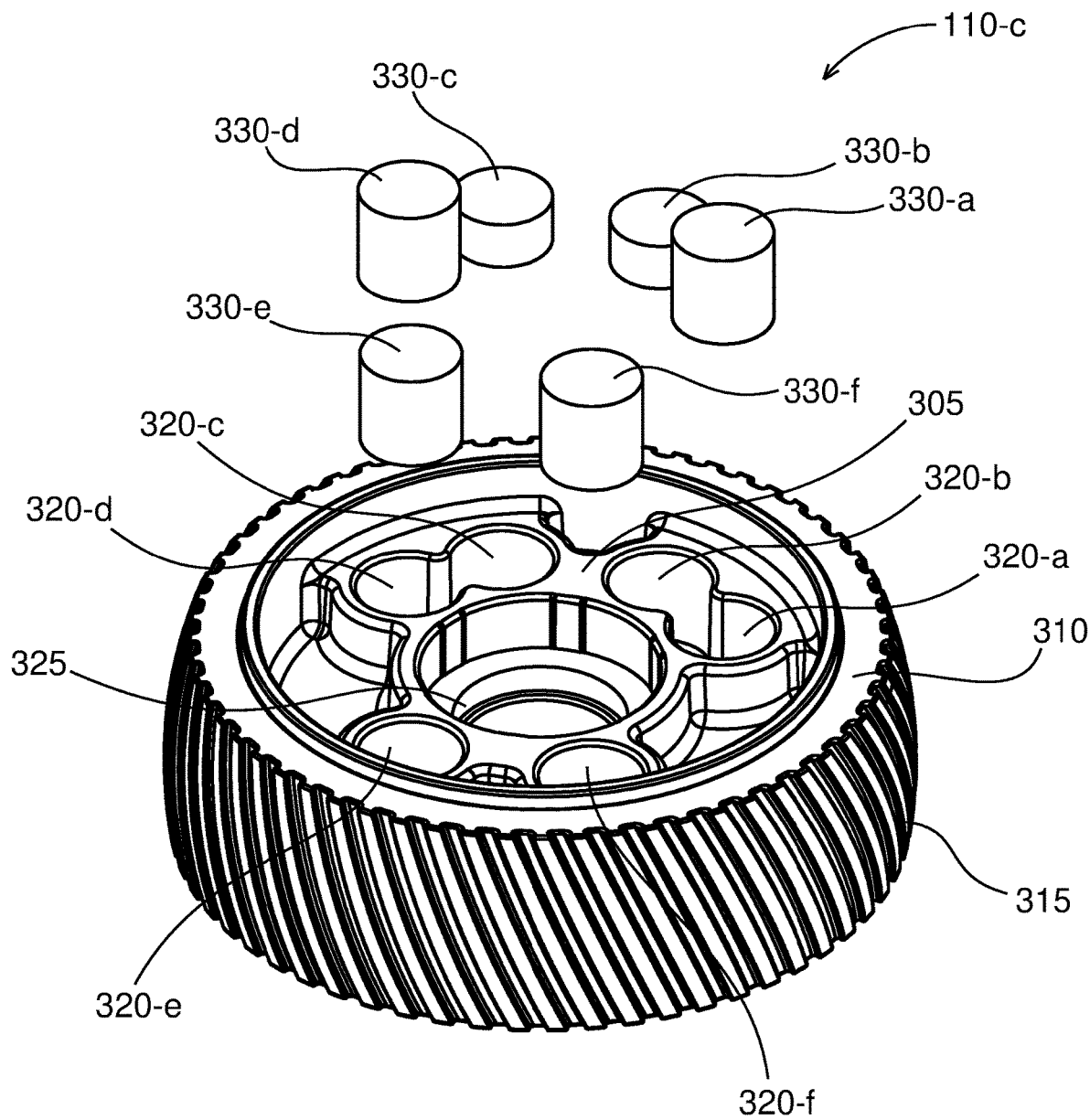
FIG. 25 illustrates an exemplary embodiment of a rotary dial with magnets prior to placement within the rotary dial from a perspective view.

FIG. 25 illustrates an exemplary embodiment of a rotary dial 110-c with magnets 330-a, 330-b, 330-c, 330-d, 330-e, and 330-f prior to placement within the rotary dial 110. As illustrated, each magnet 330 may be a cylinder (sometimes referred to as a disk, for example). The recessed pockets 320 (e.g., 320-a, 320-b, 320-c, 320-d, 320-e, and 320-f) may hold the magnets 330 (e.g., 330-a, 330-b, 330-c, 330-d, 330-e, and 330-f) at the position and orientation so as to create the desired magnetic field effect. It is appreciated that the magnetic field created by a pair and/or multiple pairs of magnets 330 varies based on the proximity (e.g., spacing between), orientation (e.g., angle), and relative polarity of each magnet 330. The collective magnetic field produced by the magnets 330 (e.g., the multiple pairs of magnets 330) is observed by the Hall effect sensor (e.g., Hall effect sensor 215). As the rotary dial 110 is rotated, the magnetic field produced by the magnets 330 changes with respect to the relative (e.g., fixed) position of the Hall effect sensors and results in an output voltage.

As illustrated, the rotary dial 110 may hold the magnets 330 in a vertical orientation and position. In some embodiments, not shown, the rotary dial 110 may position and/or orient the magnets 330 at an angle of 15-45 degrees. In yet another embodiment the recessed pocket 320 holds the magnet 330 at an angle of 29 degrees. As discussed below, the voltage response changes based on magnet 330 position and orientation, especially with respect to the motion of the rotary dial 110 as it relates to the Hall effect sensor (e.g., Hall effect sensor 215 that is within the sealed unit 205).

In some embodiments, each pair of magnets 330 (e.g., magnets 330-a and 330-d, magnets 330-b and 330-c, magnets 330-e and 330-f) may be magnetized such that the axis of the North and South magnetic poles correspond with the axis of the cylinder of the magnet 330, with each member of each pair being polarized oppositely from the other member of the pair (e.g., one N/S while the other is S/N). It is appreciated that the rotary dial 100 centers such that the Hall effect sensor is in the middle of the arc between the recessed pockets 320-b and 320-c. It is appreciated that the Hall effect sensor is within the sealed unit 205 and thus above the top surface 305 of the rotary dial 110.

Figure 26:
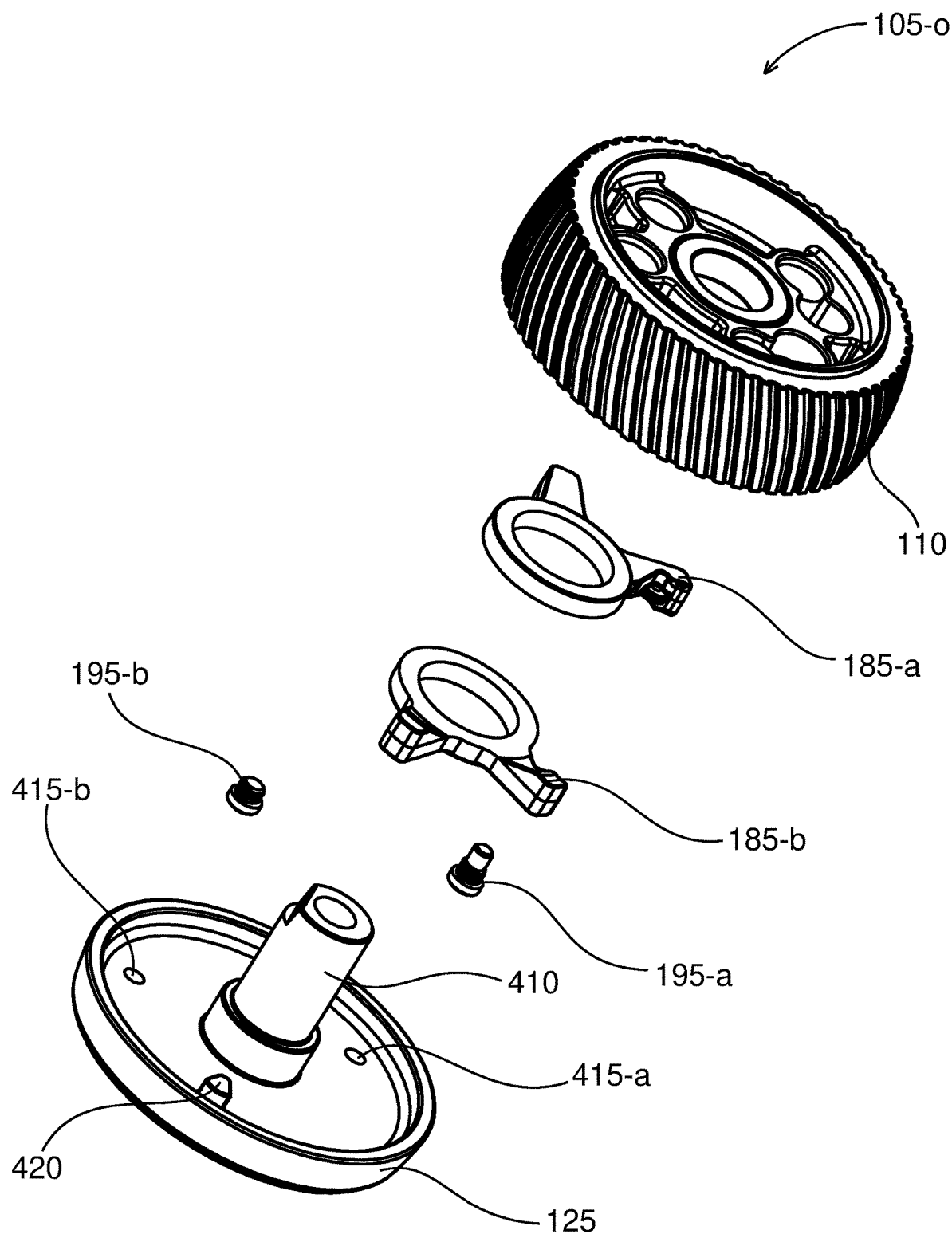
FIG. 26 illustrates an exploded view of an exemplary embodiment of subset of a rotary transducer that includes a rotary dial, an arm assembly, the lower housing, and the mode selection screws.

FIG. 26 illustrates an exploded view of an exemplary embodiment of subset of a rotary transducer 105-o that includes a rotary dial 110, an arm assembly 185, the lower housing 125, and the mode selection screws 195. As illustrated, the lower housing 125 includes an axial cylinder 410 that protrudes from the center of the lower housing 125 and acts as the axle about which the arm assembly 185 and the rotary dial 110 rotate.

Figure 34:
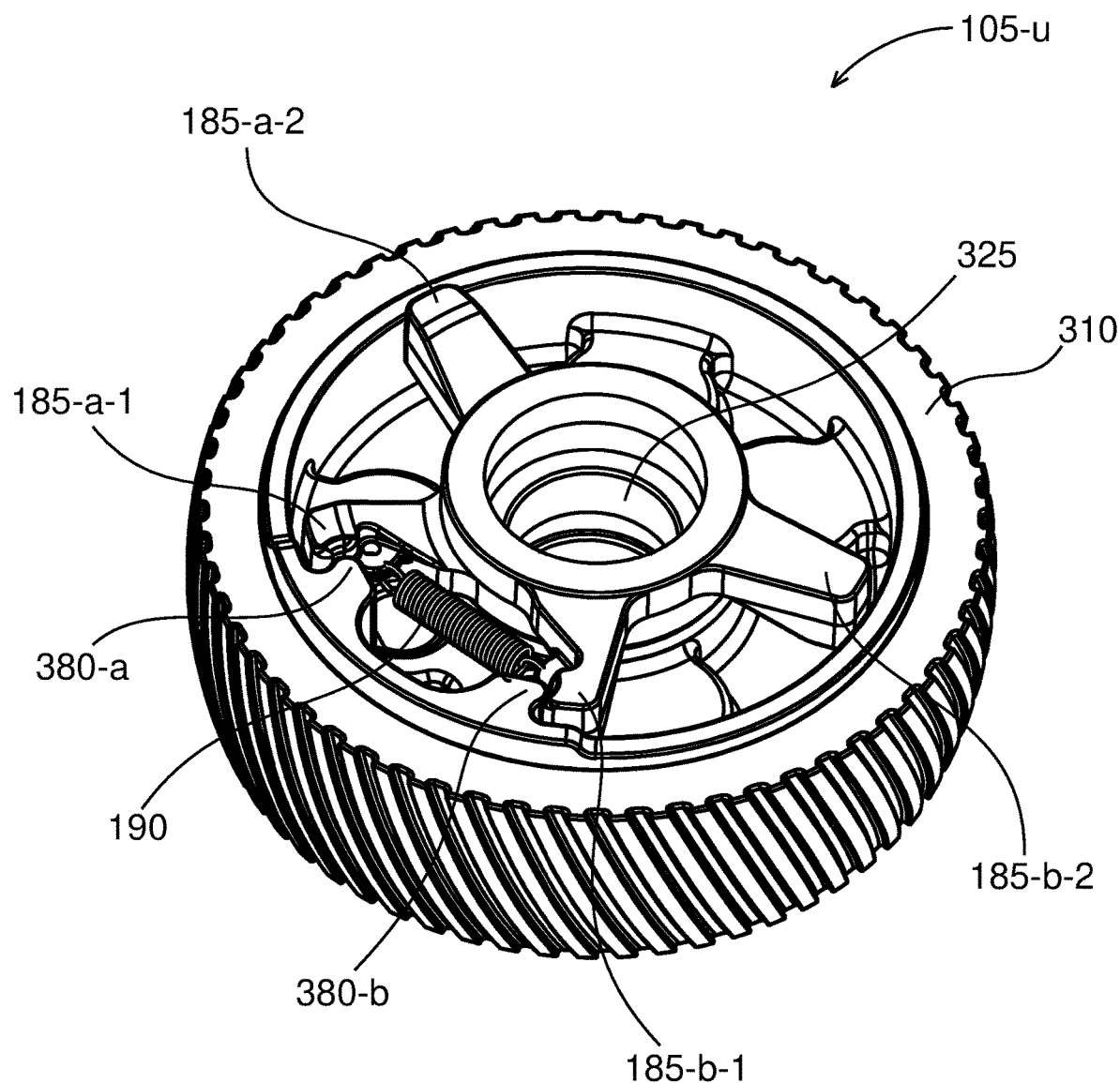
FIG. 34 illustrates a perspective view of how the arm assemblies interface with the rotary dial in an exemplary embodiment of a rotary transducer.

The arm assembly 185 includes two separate arm assemblies 185-a and 185-b that are coupled together with a spring 190 (not shown in FIG. 26) but otherwise rotate independently from each other about the axial cylinder 410. Each arm assembly 185-a or 185-b includes an annulus (for rotating around the axial cylinder 410 of the lower housing 125, for example) with two extending lengths within one hemisphere. One of the extending lengths interfaces with a corresponding protrusion 420 in the lower housing 125. The protrusion 420 stops the extending length and thus the arm assembly (185-a or 185-b) from rotating past a center position. The other extending length of the arm assembly (185-a or 185-b) interfaces directly with the rotary dial 110 as illustrated in FIG. 34.

The spring 190 in combination with the arm assemblies 185-a and 185-b and the protrusions 420 defines a center position. That is, each arm assembly 185-a and 185-b is stopped from rotating together by the respective protrusions 420, though being drawn together by the spring 190. Each arm assembly 185-a and 185-b is in contact with the rotating dial 110, which in combination with the spring tension provided by spring 190 serves to center the rotating dial 110 in this center position (e.g., relative to the sealed unit 205).

When the rotary dial 110 is rotated in either direction, the corresponding arm assembly (185-a or 185-b) engages or is already in contact with the rotary dial 110, and rotates with the rotary dial 110. Since each arm assembly (185-a or 185-b) is prevented from moving towards center as a result of the protrusions 420 (e.g., 420-a or 420-b), only one of the arm assemblies 185-a or 185-b rotates with the rotary dial 110 (i.e., the arm assembly 185-a or 185-b on the side that is away from the center position). Because one arm assembly 185-a or 185-b is prevented from going toward center, the spring 190 is increasingly stretched (with increasing spring pressure, for example) as the other arm assembly 185-a or 185-b is rotated increasingly away from the center position. It is appreciated that level of acceleration and/or deceleration increases as the arm assembly 185-a or 185-b rotated away from the center position (in relation to the increase in spring tension/pressure, for example). In some embodiments, the level of acceleration and/or deceleration increases exponentially as the arm assembly 185-a or 185-b is rotated increasingly away from the center position. This variable change based on the amount of deflections from the center position enables fine tuned acceleration and/or deceleration control outputs (e.g., control commands) based on the position of the rotary dial 110.

If the rotary dial 110 is released the spring pressure from the spring 190 would draw the respective assembly arm 185-a or 185-b (and the rotary dial 110 which is engaged with the arm assembly 185-a or 185-b) towards the center position. To the extent that the rotary dial 110 is rotated in the other direction, the other arm assembly 185-a or 185-b interfaces with the rotary dial 110 to effect the same increasing resistance and centering action of the rotary dial 110. In some embodiments, the axial cylinder 410 may be greased with a dampening grease that dampens the centering action provided by the spring 190.

The mode selection screws 195-a and 195-b may be inserted into the mode selection holes 415-a and 415-b to change rotary transducer 105 modes between acceleration only (e.g., the rotary dial 110 can only rotate in one direction (i.e., to the right for acceleration)) and bi-directional acceleration/deceleration (e.g., the rotary dial 110 can rotate in both direction (i.e., both to the right for acceleration and to the left for deceleration (via regenerative braking, for example)). The interaction between the mode selection screws 195-a and 195-b and the arm assemblies 185-a and 185-b is described more fully below.

Figure 27:
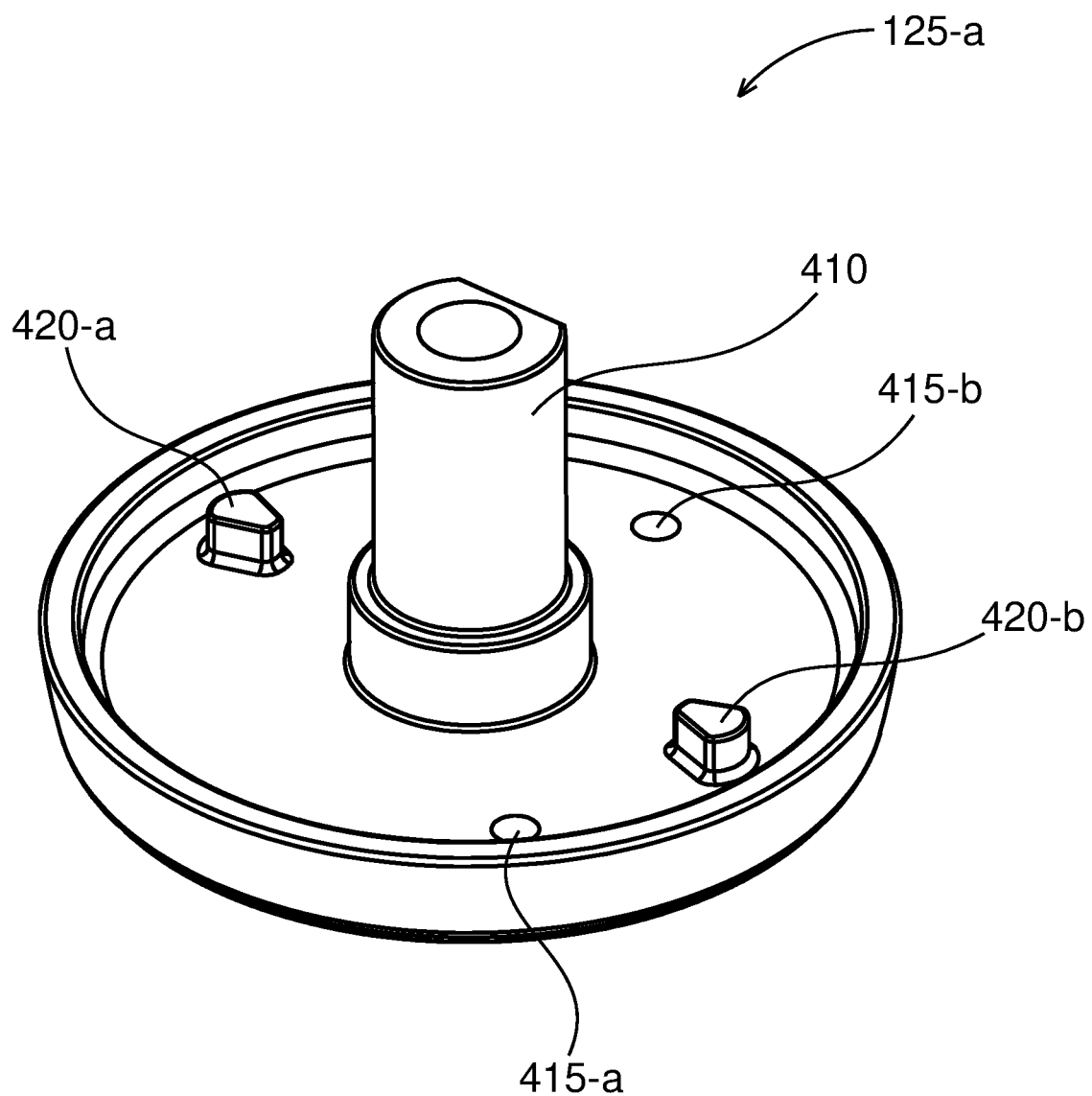
FIG. 27 illustrates a perspective view of an exemplary embodiment of a lower housing.

FIG. 27 illustrates a perspective view of an exemplary embodiment of a lower housing 125-a. The lower housing 125 includes an axial cylinder 410 that protrudes from the center of the lower housing 125, two corresponding protrusions 420-a, 420-b that act as limiters for the arm assemblies 185 (to define a center limit, that prevents the arm assembly from rotating any closer towards the center position, for example). The lower housing 125 also includes mode selection holes 415-a and 415-b.

The mode selection holes 415-a, 415-b are strategically placed to properly select between the two operational modes (e.g., single directional acceleration only and bi-directional acceleration/deceleration). As illustrated, one mode selection hole 415-b is located in the back, out of the way of the arm assemblies 185 and thus any interference with the movement of the arm assemblies (at least with respect to the normal rotational range of the arm assemblies 185. As illustrated, the other mode selection hole 415-a is directly in the path of the arm assembly 185 that engages with the protrusion 420-b. In some embodiments, the mode selection hole 415-a is positioned such that a mode selection screw that protrudes above the lower housing 125 would interface with the arm assembly 185 that interfaces with the protrusion 420-b and between the protrusion 420-b and such mode selection screw (e.g., screw 195-a) would completely prevent that arm assembly 185 from moving in either direction (accordingly, preventing the rotary dial 110 from rotating in that direction, as is the case with a throttle only mode, for example).

In some embodiments, the axial cylinder 410 may be notched or otherwise differentiated, as illustrated, so that the lower housing 125 may be affixed to the upper housing (e.g., upper housing 120) in a manner that prevents the lower housing 125 to rotate with respect to the upper housing. Although not shown, the upper housing may include a corresponding notch or differentiation to affix the lower housing 125 in an immovable (e.g., un-rotatable manner) to the upper housing.

Figure 28:
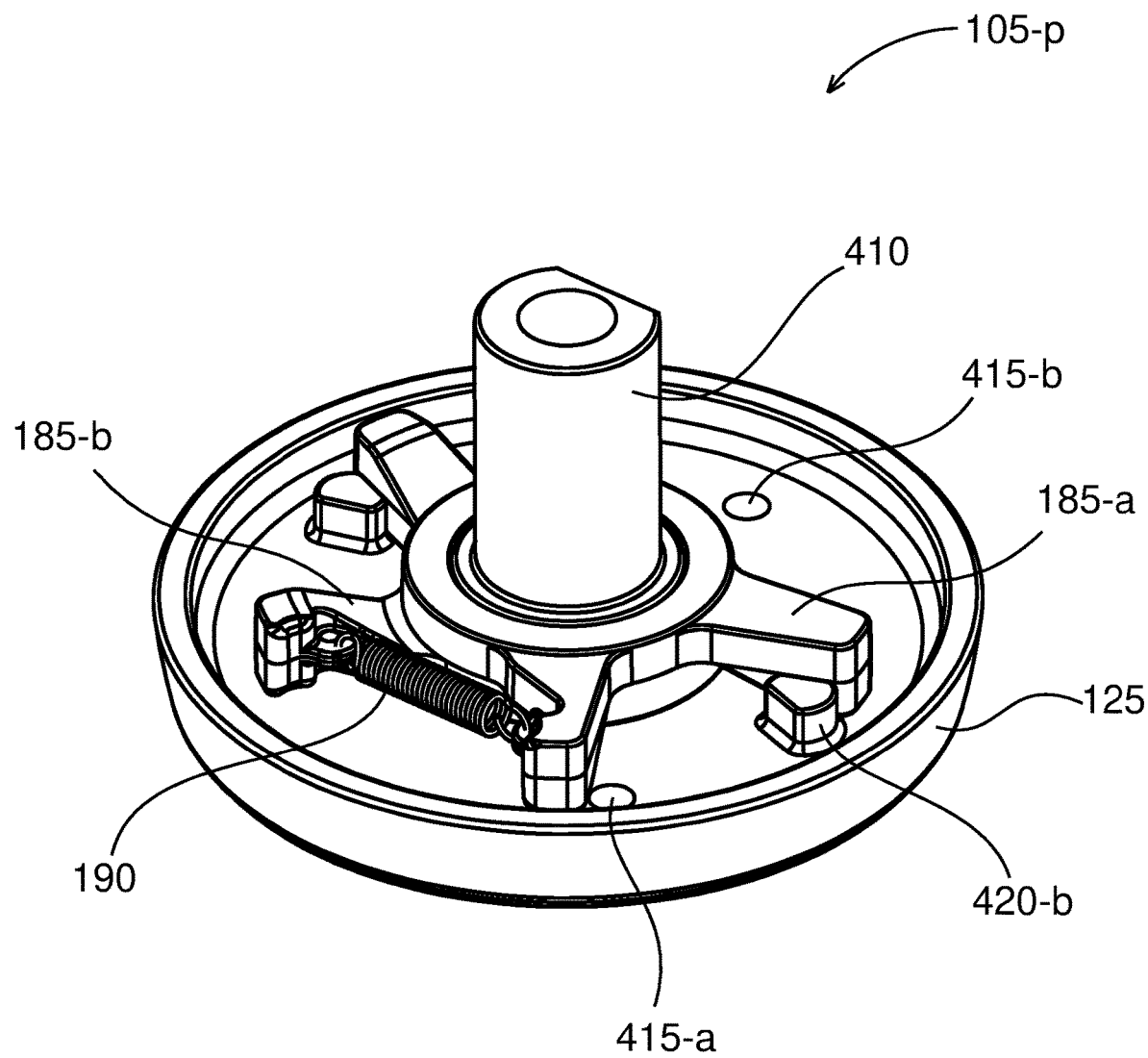
FIG. 28 illustrates a perspective view of an exemplary embodiment of a subset of a rotary transducer.

FIG. 28 illustrates a perspective view of an exemplary embodiment of a subset of a rotary transducer 105-p. As illustrated, the rotary transducer 105 includes a lower housing 125, a first arm assembly 185-a, a second arm assembly 185-b, and a spring 190 that couples the first arm assembly 185-a and the second arm assembly 185-b. As illustrated, both the first arm assembly 185-a and the second arm assembly 185-b are in the center position. In this center position, the first arm assembly 185-a is engaged with the protrusion 420-b, which prevents the first arm assembly 185-a from moving any closer to the center, and the second arm assembly 185-b is engaged with the protrusion 420-a, which prevents the second arm assembly 185-b from moving any closer to the center. In this arrangement, the spring 190 provides constant spring tension between the first arm assembly 185-a and the second arm assembly 185-b, which holds the arm assemblies 185-a and 185-b in this center position.

In some embodiments, as illustrated, the extending lengths of each arm assembly 185 are configured to engage and/or interface with the corresponding protrusion 420 so that the protrusion 420 defines the full range of motion (e.g., range of rotation) of each arm assembly 185. For example, one extending length of the first arm assembly 185-a is engaged with protrusion 240-b and if the first arm assembly 185-a is rotated to its max the other extending length of the first arm assembly 185-a would be engaged with the with the protrusion 420-b, thus confining the rotational range of the first arm assembly 185-a based on the angular sweep of the two extending lengths of the first arm assembly 185-a. It is appreciated that the same applies to the second arm assembly 185-b with respect to the protrusion 420-a.

As illustrated, the mode selection hole 415-a is adjacent to the extending length of the first arm assembly 185-a, and is thus positioned to enable the first arm assembly 185-a to be affixed in place and (e.g., not rotatable if an interfering mode selection screw (e.g., mode selection screw 195-a) is inserted into the mode selection hole 415-a. As a result of the rotation limits defined by the angular sweep of the extending lengths of the arm assemblies 185 and the positioning of the protrusions 420, the other mode selection hole 415-b is out of rotational range of either of the arm assemblies.

Figure 29:
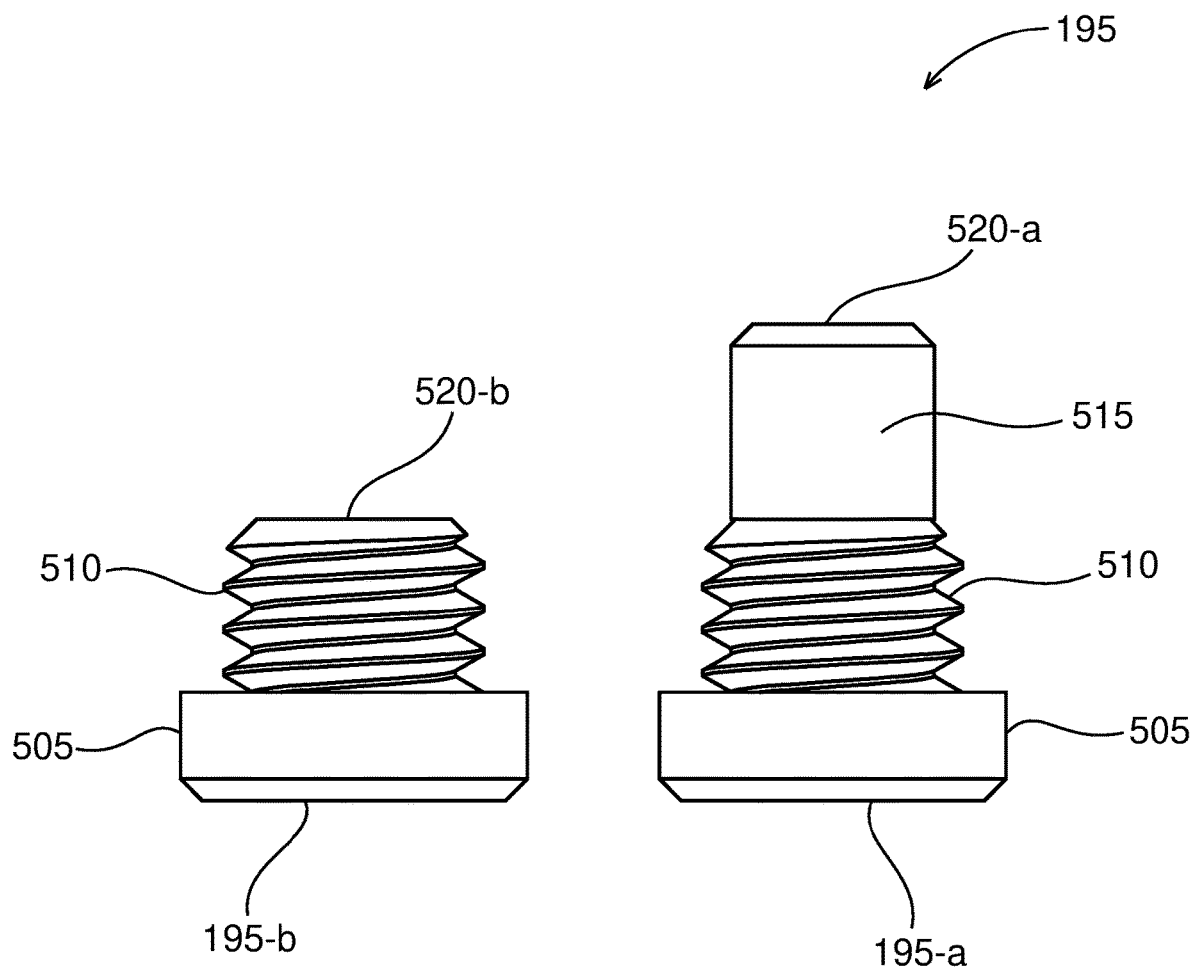
FIG. 29 illustrates a front view of an exemplary embodiment of a pair of mode selection screws.

FIG. 29 illustrates a front view of an exemplary embodiment of a pair of mode selection screw 195-a, 195-b. The pair of mode selection screws 195-a, 195-b are inherently different so as to enable the configuration between different modes. Both mode selection screws 195 include a screw head 505, machine threads 510, and a top surface 520. As illustrated, the first mode selection screw 195-a includes a protruding section 515 between the machine threads 510 and the top surface 520-a while the second mode selection screw 195-b includes only the machine threads 510 and a top surface 520-b such that the top surface 520-b of the second mode selection screw 195-b is adjacent with the machine threads 510.

In some embodiments, the depth of the machine threads 510 corresponds with the depth of the lower housing (e.g., lower housing 125) so that the top surface 520-b of the second mode selection screw 195-b is flush with an internal surface of the lower housing, while the protruding section 515 and the top surface 520-a of the first mode selection screw 195-a extends above an internal surface of the lower housing and is intentionally designed to protrude and interfere with the rotation of am arm assembly (e.g., arm assembly 185-a). The use and different configurations of the first and second mode selection screws 195 is illustrated in FIGS. 30-33.

Figure 30:
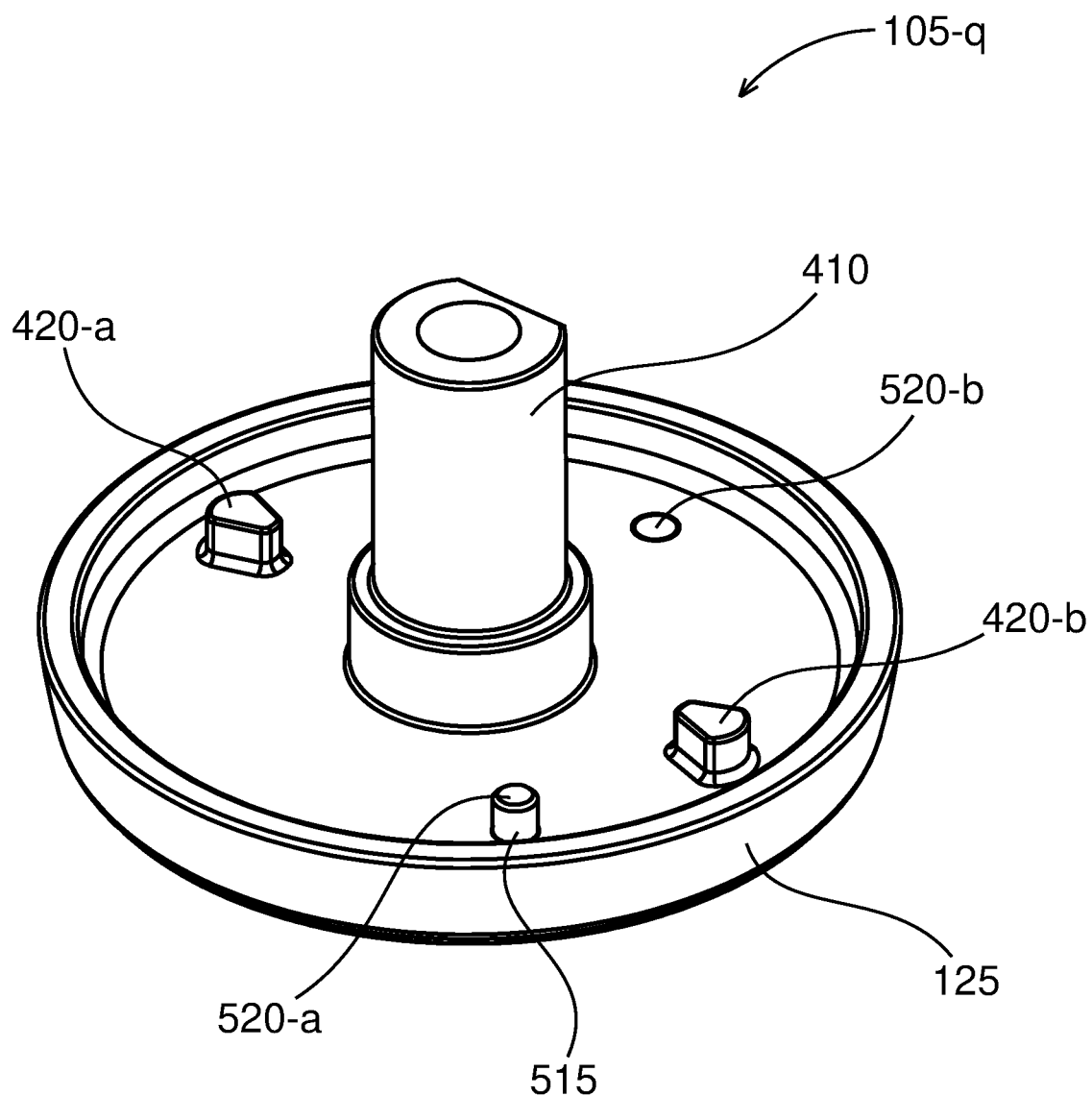
FIG. 30 illustrates a perspective view of an exemplary embodiment of a rotary transducer in which the lower housing is shown, and the mode selection screws are configured in a first mode (e.g., acceleration only mode).

FIG. 30 illustrates a perspective view of an exemplary embodiment of a rotary transducer 105-q in which the lower housing 125 is shown and the mode selection screws 195 are configured in a first mode (e.g., acceleration only mode). As illustrated in FIG. 30, the first mode selection screw (mode selection screw 195-a) is inserted into a first mode selection hole (mode selection hole 415-a) and the second mode selection screw (mode selection screw 195-b) is inserted into a second mode selection hole (mode selection hole 415-b). In this embodiment, the protruding cylinder 515 and the top surface 520-a of the first mode selection screw protrude above the surface of the lower housing 125 while the top surface 520-b of the second mode selection screw is flush with the surface of the lower housing 125.

Figure 31:
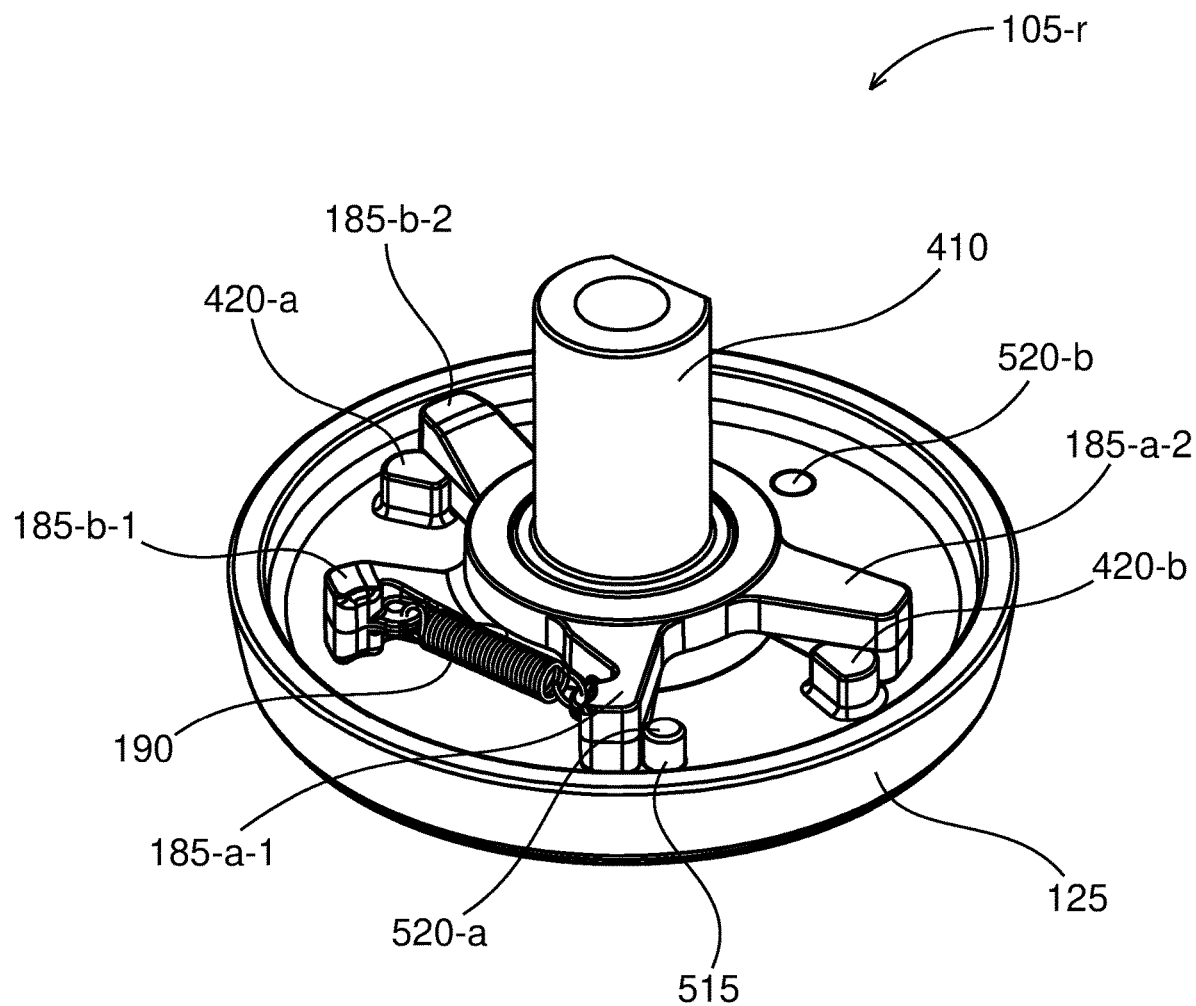
FIG. 31 illustrates a perspective view of an exemplary embodiment of a rotary transducer in which the lower housing and the arm assemblies are shown, and the mode selection screws are configured in a first mode (e.g., acceleration only mode).

FIG. 31 illustrates a perspective view of an exemplary embodiment of a rotary transducer 105-r in which the lower housing 125 and the arm assemblies 185-a and 185-b are shown and the mode selection screws 195 are configured in a first mode (e.g., acceleration only mode). In FIG. 31, the mode selection screws 195 are installed in the lower housing 125 as illustrated in FIG. 30. As illustrated in FIG. 31, the protruding section 515 of the first mode selection screw (mode selection screw 195-a) engages with a first extending length 185-a-1 of the first arm assembly 185-a, which in combination with the protrusion 420-b engaging with a second extending length 185-a-2 of the first arm assembly 185-a locks the first arm assembly 185-a in place. In this embodiment, with the first arm assembly 185-a locked in place, the only rotation that is possible is with the second arm assembly 185-b, thus enabling a one direction only mode (e.g., an acceleration only mode). It is appreciated that the top section 520-b of the second mode selection screw 195-b is flush with the internal surface of the lower housing 125. In this mode, the second mode selection screw 195-b is irrelevant to the operation of the arm assemblies 185-a and 185-b, and thus the operation of the rotary transducer 105.

Figure 32:
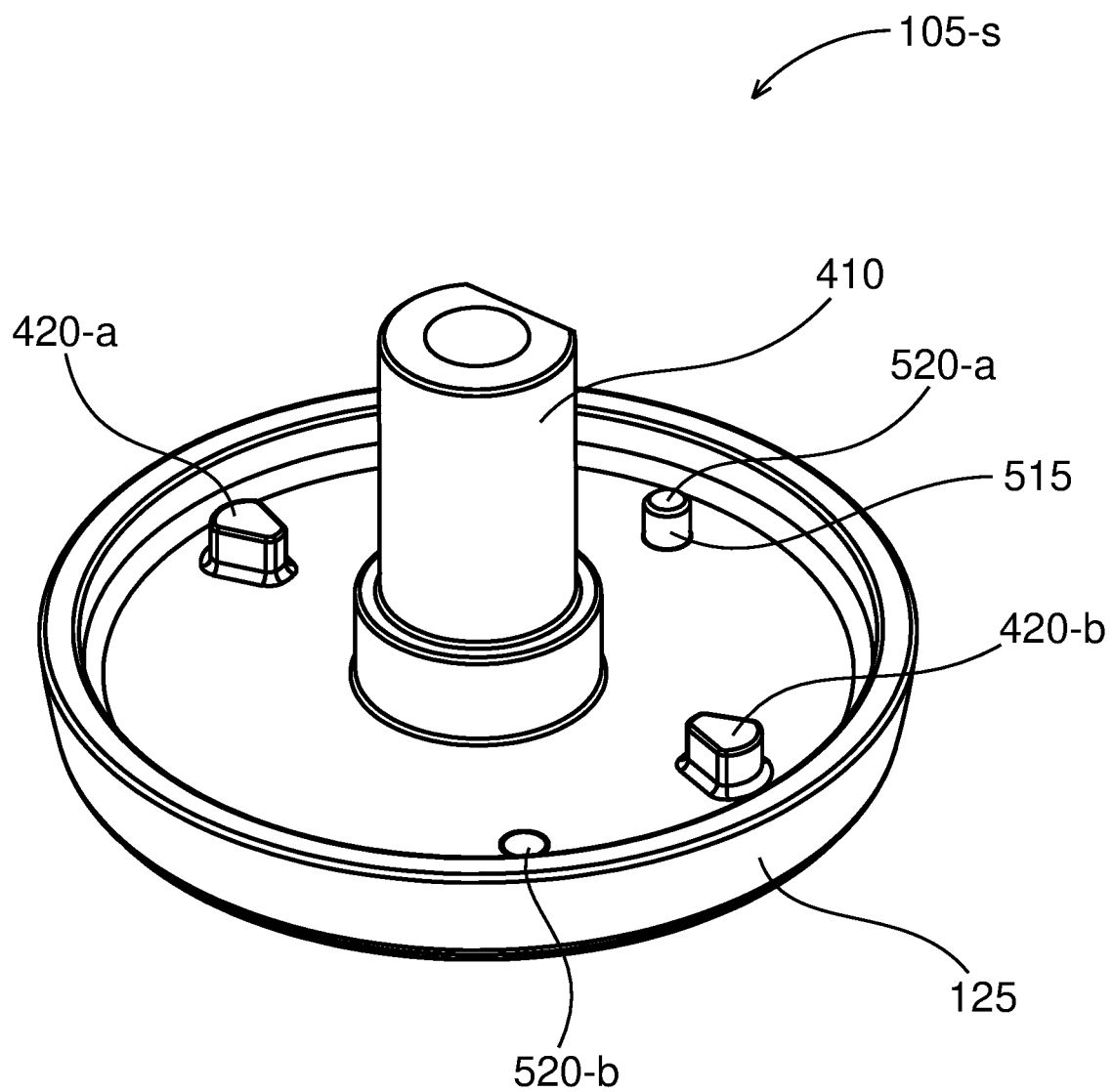
FIG. 32 illustrates a perspective view of an exemplary embodiment of a rotary transducer in which the lower housing is shown, and the mode selection screws are configured in a second mode (e.g., bi-directional acceleration/deceleration mode).

FIG. 32 illustrates a perspective view of an exemplary embodiment of a rotary transducer 105-s in which the lower housing 125 is shown and the mode selection screws 195 are configured in a second mode (e.g., bi-directional acceleration/deceleration mode). As illustrated in FIG. 32, the second mode selection screw (mode selection screw 195-*b* is inserted into a first mode selection hole (mode selection hole 415-*a*) and the first mode selection screw (mode selection screw 195-*a*) is inserted into a second mode selection hole (mode selection hole 415-*b*). In this embodiment, the protruding cylinder 515 and the top surface 520-*a* of the first mode selection screw protrude above the surface of the lower housing 125 while the top surface 520-*b* of the second mode selection screw is flush with the surface of the lower housing 125.

Figure 33:
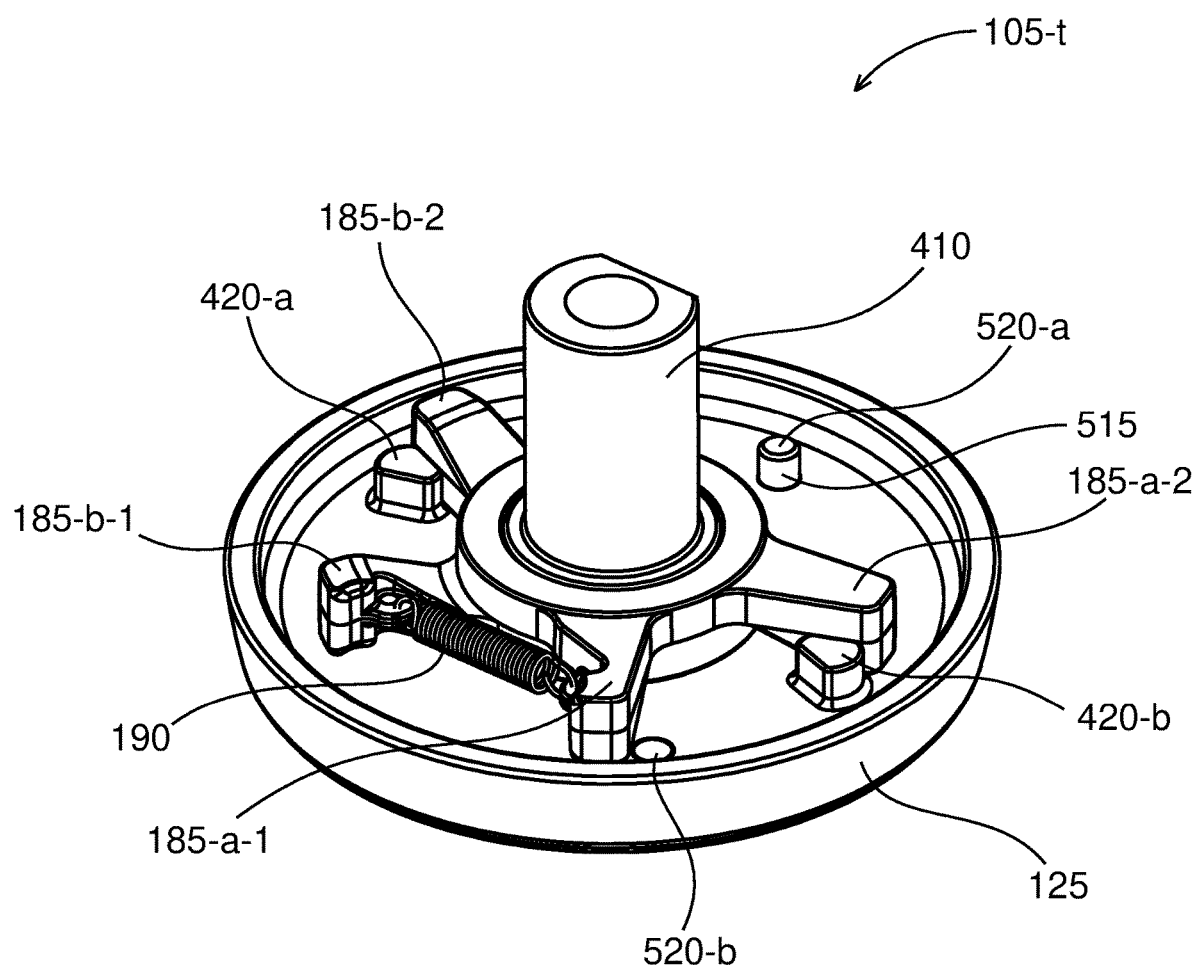
FIG. 33 illustrates a perspective view of an exemplary embodiment of a rotary transducer in which the lower housing and the arm assemblies are shown, and the mode selection screws are configured in a second mode (e.g., bi-directional acceleration/deceleration mode).

FIG. 33 illustrates a perspective view of an exemplary embodiment of a rotary transducer 105-*r* in which the lower housing 125 and the arm assemblies 185-*a* and 185-*b* are shown, and the mode selection screws 195 are configured in a second mode (e.g., bi-directional acceleration/deceleration mode). In FIG. 33, the mode selection screws 195 are installed in the lower housing 125 as illustrated in FIG. 32. As illustrated in FIG. 33, the protruding section 515 of the first mode selection screw (mode selection screw 195-*a*) protrudes but is non-interfering with either of the arm assemblies 185-*a*, 185-*b* because of its location in the back and opposite to the centering point. The top surface 520-*b* of second mode selection screw 195-*b*, as illustrated, is flush with the surface of the lower housing 125 and as such is non-interfering with the first extending length 185-*a*-1 of the first arm assembly 185-*a*.

In this mode, both of the first mode selection screw 195-*a* and the second mode selection screw 195-*b* are non-interfering and thus irrelevant to the operation of the arm assemblies 185-*a* and 185-*b*, and thus the operation of the rotary transducer 105. As a result, both the first arm assembly 185-*a* and the second arm assembly 185-*b* are rotatable within the bounds defined by the respective protrusions 420-*a*, 420-*b*. In this embodiment, with the first arm assembly 185-*a* rotatable and the second arm assembly 185-*b*, the rotary dial 110 of the rotary transducer 105 can be rotated in either direction, thus enabling a bi-direction mode (e.g., a bi-directional acceleration/deceleration mode).

FIG. 34 illustrates a perspective view of how the arm assemblies 185 interface with the rotary dial 110 in an exemplary embodiment of a rotary transducer 105-*u*. As illustrated in FIG. 34, the dial body 310 of the rotary dial (e.g., rotary dial 110) includes a first interfacing protrusion 380-*a* that interfaces with a first extending length 185-*a*-1 of the first arm assembly 185-*a* and a second interfacing protrusion 380-*b* that interfaces with a first extending length 185-*b*-1 of the second arm assembly 185-*b*. In some embodiments, the first interfacing protrusion 380-*a* and the second interfacing protrusion 380-*b* are spaced to accommodate the spacing between the first extending length 185-*a*-1 of the first arm assembly 185-*a* and the first extending length 185-*b*-1 of the second arm assembly 185-*b*. By matching the spacing between the interfacing protrusions 380 and the centered spacing of the arms assembly 185, any dead zone in the centered (e.g., default position) may be minimized or eliminated. In the case of rotation of the rotary dial 110, the interfacing protrusion 380 (e.g., interfacing protrusion 380-*b*) that is pushing the arm assembly 185 (e.g., arm assembly 185-*b*) that is being rotated will remain in contact (e.g., engaged with) while the other interfacing protrusion 380 (e.g., interfacing protrusion 380-*a*), as it is part of the dial body 310 that is rotating will separate from the arm assembly 185 (e.g., arm assembly 185-*a* that is not moving (e.g., is being left behind).

Figure 35:
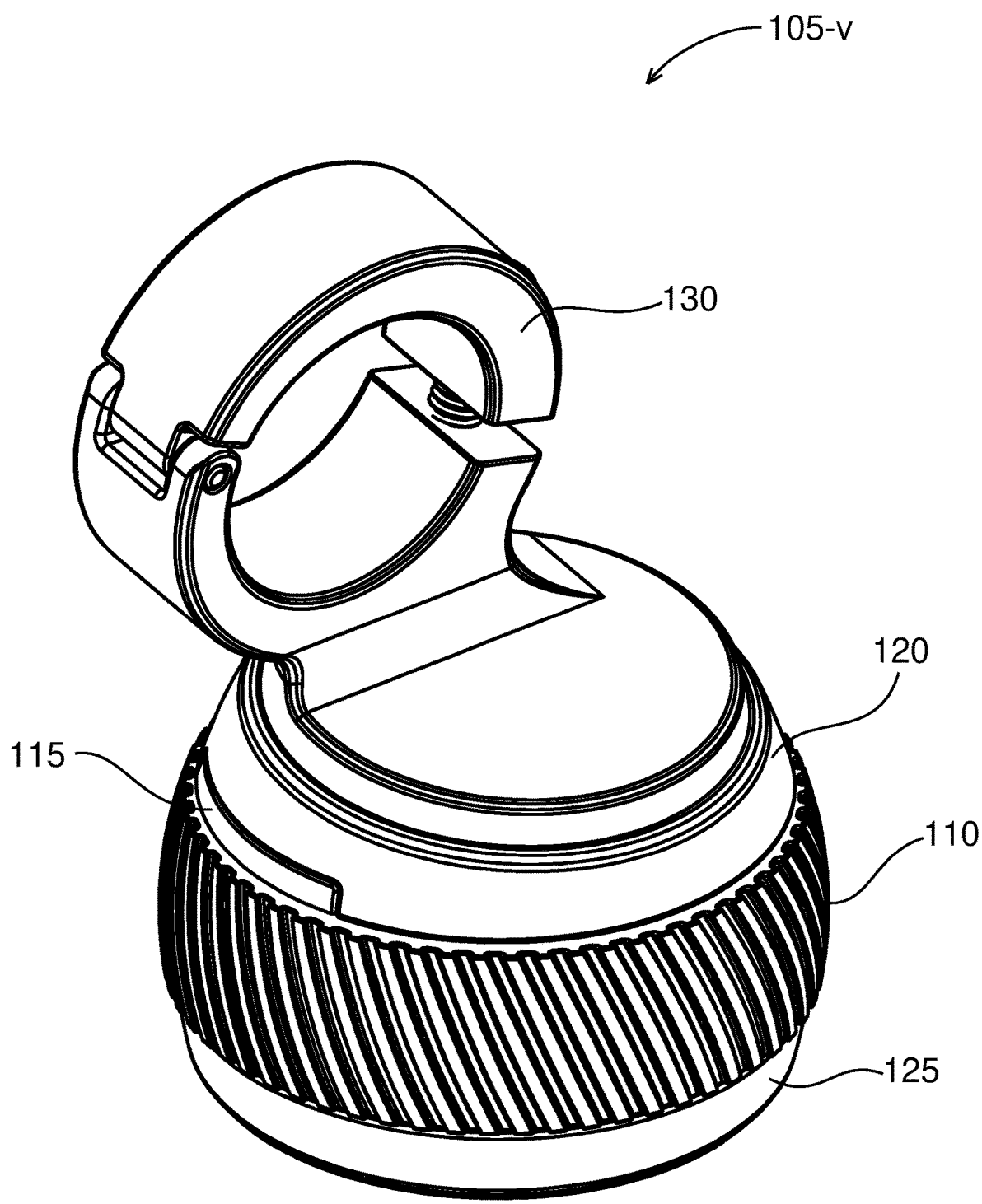
FIG. 35 illustrates an exemplary embodiment of a rotary transducer from a front perspective view.

FIG. 35 illustrates an exemplary embodiment of a rotary transducer 105-*v* from a front perspective view. As described herein, the rotary dial 110 may be rotated by a user. In an acceleration only mode, as selected by the mode selection screws (e.g., mode selection screws 195), the rotary dial 110 may be rotated in only a single direction (e.g., throttle only). In a bi-directional acceleration/deceleration mode, as selected by the mode selection screws (e.g., mode selection screws 195), the rotary dial 110 may be rotated in both directions (e.g., selectively increasing acceleration by rotating in a first direction, and selectively increasing deceleration by rotating in the other direction). The amount of deflection of the rotary dial 110 from its center position may be visually indicated using one or more LED lights within the sealed unit 205 and is visible through the indicator window 115. Accordingly, the rotary dial 105 may be used in multiple modes through the strategic use of the mode selection screws.

As should be clear from the above description, the dimensions of the magnets, the magnetization orientation, the position, and the angle all affect the system voltage output and linearity. In addition, the selection of the material and the placement of the materials also affect the magnetic field. For example, a sealed unit made from a ferreous metal would affect the whole system. The selection and placement of materials is guided by the description above.

The invention has been described with reference to various specific and preferred embodiments and techniques. Nevertheless, it is understood that many variations and modifications may be made while remaining within the spirit and scope of the invention.

What is claimed is:
1. A rotary transducer, comprising:
a housing;
a Hall effect sensor;
a rotary dial comprising at least two recessed pockets;
a spring mechanism that interfaces with both the housing and the rotary dial, wherein the spring mechanism centers the rotary dial at a center position with respect to the housing, wherein the spring mechanism provides increasing spring tension that pulls the rotary dial toward the center position when the rotary dial is deflected in a first direction away from the center position, and wherein the spring mechanism provides increasing spring tension that pulls the rotary dial toward the center position when the rotary dial is deflected in a second direction away from the center position;
a first magnet that is positioned within one of the at least two recessed pockets; and
a second magnet that is positioned within another one of the at least two recessed pockets.
2. The rotary transducer of claim 1, wherein the second direction is diametrically opposed to the first direction.
3. The rotary transducer of claim 1, wherein the center position is fixed with respect to the housing, wherein the Hall effect sensor is fixed with respect to the housing, and wherein the rotary dial rotates with respect the housing.
4. The rotary transducer of claim 3, wherein the first magnet and the second magnet are fixed within the rotary dial such that the first magnet and the second magnet rotate with the rotary dial as the rotary dial rotates.
5. The rotary transducer of claim 3, wherein the first magnet and the second magnet are positioned within the at least two recessed pockets such that a polarity of the first magnet is opposite from a polarity of the second magnet.

6. The rotary transducer of claim 3, wherein the first magnet and the second magnet create a magnetic field, and wherein the Hall effect sensor outputs a voltage based on the magnetic field.

7. The rotary transducer of claim 6, wherein the magnetic field changes as the rotary dial rotates, and wherein the voltage output by the Hall effect sensor changes as the magnetic field changes.

8. The rotary transducer of claim 1, wherein the housing comprises a first mode selection orifice, and wherein the first mode selection orifice is threaded.

9. The rotary transducer of claim 8, further comprising a first mode selection screw.

10. The rotary transducer of claim 9, wherein the rotary dial is rotatable from the center position in the first direction over a first range of rotation and is rotatable from the center position in the second direction over a second range of rotation when the first mode selection screw is not inserted into the first mode selection orifice.

11. The rotary transducer of claim 10, wherein the Hall effect sensor outputs a first voltage range in response to the rotary dial rotating through the first range of rotation.

12. The rotary transducer of claim 11, wherein the first voltage range is between 2.51 volts direct current and 5 volts direct current.

13. The rotary transducer of claim 10, wherein the Hall effect sensor outputs a second voltage range in response to the rotary dial rotating through the second range of rotation.

14. The rotary transducer of claim 13, wherein the second voltage range is between 0 volts direct current and 2.49 volts direct current.

15. The rotary transducer of claim 9, wherein the rotary dial is rotatable from the center position in the first direction over a third range of rotation and is not rotatable from the center position in the second direction when the first mode selection screw is inserted into the first mode selection orifice.

16. The rotary transducer of claim 15, wherein the Hall effect sensor outputs a third voltage range in response to the rotary dial rotating through the third range of rotation.

17. The rotary transducer of claim 16, wherein the third voltage range is between 0 volts direct current and 5 volts direct current.

* * * * *